United States Patent [19]

Batterman et al.

[11] Patent Number: 5,189,292
[45] Date of Patent: Feb. 23, 1993

[54] FINDER PATTERN FOR OPTICALLY ENCODED MACHINE READABLE SYMBOLS

[75] Inventors: Eric P. Batterman, Flemington; Donald G. Chandler, Princeton, both of N.J.

[73] Assignee: Omniplanar, Inc., Princeton, N.J.

[21] Appl. No.: 606,016

[22] Filed: Oct. 30, 1990

[51] Int. Cl.[5] .................... G06K 19/06; G06K 7/10; G06K 19/00; G06K 9/36
[52] U.S. Cl. .................. 235/494; 235/456; 235/487; 283/93; 380/51; 382/56
[58] Field of Search ............ 235/456, 487, 494, 469; 382/48, 34, 56; 380/51

[56] References Cited

U.S. PATENT DOCUMENTS

| | | | |
|---|---|---|---|
| 3,058,093 | 10/1962 | Vernon et al. | 382/48 |
| 3,200,373 | 8/1965 | Rabinow | 382/48 |
| 3,513,320 | 5/1970 | Weldon . | |
| 3,603,728 | 9/1971 | Arimura . | |
| 3,693,154 | 9/1972 | Riley . | |
| 3,801,775 | 4/1974 | Acker . | |
| 4,286,146 | 8/1981 | Uno et al. | 235/494 |
| 4,874,936 | 10/1989 | Chandler et al. . | |
| 4,896,029 | 1/1990 | Chandler et al. . | |
| 4,939,354 | 7/1990 | Priddy et al. . | |

OTHER PUBLICATIONS

USD-5 Automatic Identification Manufacturers Uniform Symbol Description. Presence/Absence Code. Material Handling Institute Pittsburgh Pa 15238 1982.

*Primary Examiner*—Eugene R. LaRoche
*Assistant Examiner*—Christopher R. Glembocki
*Attorney, Agent, or Firm*—Allan Jacobson

[57] ABSTRACT

An optically encoded information bearing label containing a two dimensional array of data cells includes a finder pattern comprising a plurality of spots arranged in a predetermined geometric pattern substantially analogous to the predetermined geometric pattern of said two dimensional array of data cells. The finder pattern is detected by first scanning the image area to detect spots. The locations of detected spots are compared to the known geometry of the finder pattern in order to provide for rapid and reliable finding of the finder pattern and the information bearing label. Additionally, the detected finder pattern spots provide information for decoding the two dimensional data array in order to compensate for label magnification, tilt and other distortions.

52 Claims, 15 Drawing Sheets

FINDER PATTERN FOR OPTICALLY ENCODED MACHINE READABLE SYMBOLS

FIELD OF THE INVENTION

This invention relates to the field of machine readable symbols, and particularly this invention relates to a finder pattern used to rapidly and accurately locate labels containing machine readable symbols.

BACKGROUND OF THE INVENTION

Optically encoded machine readable symbols are well known. Some types of machine readable symbols, such as bar codes, are read by scanning. Typically, an operator brings the scanner into proximity and alignment with the bar code. Omnidirectional bar code scanners, which do not require alignment by the operator, continuously scan the field of view until a successful bar code scan is achieved. Since a bar code has no special finder pattern, a bar code scanner may typically sweep a light beam in a complex geometric pattern until a successful read is accomplished.

However, many other prior art symbologies include a finder pattern, or finder target as it is sometimes called, which is used by the reader to find or locate, i.e. identify the presence or possible orientation of a label containing a machine readable symbol. For example, finder patterns comprising concentric geometric figures including rings, triangles, and hexagons are disclosed in U.S. Pat. Nos. 3,513,320 and 3,603,728. The use of a finder target comprising concentric circles, i.e. a bull's-eye, is also shown in U.S. Pat. Nos. 3,693,154 and 3,801,775. However, these prior art systems employ two separate symbols to identify the machine readable symbol and indicate its position, thereby increasing the complexity of the reader and reducing the data carrying capacity of the label.

More recently, U.S. Pat. Nos. 4,874,936 and 4,896,029 disclose an hexagonal data array using a single finder target comprised of the plurality of concentric circles of contrasting reflectively as part of the label, but separate from the encoded information array. Concentric circles, being a rotational independent target, produce a periodic pattern of known frequency when scanned through the center of the target from any direction. In order to detect the finder target, one-dimensional scan lines are applied to a filter designed to pass the specific frequency of the concentric rings only.

One-dimensional finding of a finder pattern has a variety of serious drawbacks. The first drawback is due to magnification effects. Magnification effects are particularly acute in a belt reader system having fixed focal length optics. As a target is placed at different distances from the image acquisition system (e.g. tall versus short boxes with labels affixed to the top surfaces) the apparent frequency of the target changes. When a label is viewed at different distances from the image acquisition system, the finder target will appear to smaller or larger.

If the size of the finder target changes with distance, then the apparent frequency of the finder target when scanned through the center will also change. The filter used to detect a scan through the finder target center must therefore be designed to accept not only a specific frequency, but a band of frequencies. As the frequency band of the filter is widened, it is more likely that text, graphics, markings, and other optical features viewed by the scanner will excite the finder filter thereby causing false alarms. If there are more false alarms, there is a greater chance that the label will pass the scanning station completely undetected and unread.

The frequency of a scan through the finder target center is also increased by labels that are tilted. Tilting a finder target makes a printed circle appear to be an ellipse, which also changes the apparent frequency of the finder target when scanned at some directions through the center. Furthermore, viewing an elliptically shaped finder target can cause problems in secondary two dimensional tests which look for concentric symmetrical rings.

Another drawback to using a finder pattern of concentric rings is the need to have a sufficient number of rings to excite a filter. The more rings present, the easier it is to find the label and to discriminate against false alarms. However, using more rings reduces the usable area on the label for encoding data. More rings in the same amount of area will result in a label that has very small features. Another drawback of this system is using analog filtering which may require adjustments during manufacture and may be sensitive to environmental conditions, age of equipment, etc.

For example, in the prior art hexagonal data array cited above, the label includes a finder target with six concentric rings occupying a small percentage of the entire label. However, the entire label must have very small features to both encode the desired amount information and have a reliable finder pattern. Small features reduce the depth of field possible. The described system must use powerful illumination, a high resolution imager, a variable focus lens, and a means for sensing the height of the object being scanned. Larger features would allow fixed focus optics, a lower resolution imager, and reduced illumination, but would not provide adequate data density and would require a very large finder target. In general, it is very desirable to increase feature sizes where possible.

Another type of finder pattern used in the prior art is the USD 5 dot code consisting of a row of black squares separated by white spaces. Additionally, the area above and below the row of black squares is also white. The USD 5 finder pattern is space inefficient since it takes up a large percentage of the entire label. Furthermore, because each information bearing cell in the USD 5 label is surrounded by a large amount of non-information bearing white space, the label itself is space inefficient and can only encode a few characters of information.

SUMMARY OF THE INVENTION

The problem of finding an information encoded label has led to the need for a robust, simple, rapid, and low cost technique for signaling the presence and location of a data encoded label within the field of view of an optical scanner. A desirable finder pattern should be easy to detect, space efficient, and optionally provide information regarding the orientation, magnification, and tilt of a detected information bearing label.

The present invention is embodied in a finder pattern for use in an optically encoded label containing a two dimensional data array. Specifically, the finder pattern of the present invention comprises a plurality of spots arranged in a two dimensional array having a predetermined geometric pattern. A spot is an area of a first reflectivity, such as a light cell, completely surrounded by an area of a second reflectivity, such as by dark cells.

The finder pattern spots are arranged in a geometric pattern which is analogous to the geometric pattern of the two dimensional data array. Furthermore, in the preferred embodiment, the spots are the same size as, and are arranged in an analogous geometric pattern to the data cells of the information encoded label. The finder pattern of the present invention serves three purposes:

1. To provide a finder pattern that is easy to detect and distinguish from common backgrounds in the presence of magnification, tilt and other distortions of the information bearing label, 2. To provide information about the orientation of the label, and 3. To provide information about the cell-to-cell spacing of the two dimensional data array in the label, for use in the decoding process, and to provide information about the magnification, tilt, and other distortions of the information bearing label.

The finder pattern is detected in a two stage process. First, spots are detected by searching for cells of one reflectivity completed surrounded by cells of a second reflectivity. Second, all detected spots found in the first step are compared to the predetermined arrangement of the known finder pattern geometry. If the detected spots are in the correct pattern, the label is considered to be found. The finder pattern of the present invention allows rapid and reliable finding of a target and label even when a large amount of area must be processed.

A finder pattern in accordance with the present invention has relatively large optical features which allows the use of a low resolution reader, greatly simplifying the image acquisition system and reducing digital data processing requirements. Simple fixed focal length optics having a high depth of field may be used. Lower resolution also produces lower data rates, permitting reduced size memory buffers and lower speed data processing elements to be used. In addition, the process of identifying the finder target may be implemented digitally, thereby avoiding the use of analog filters requiring adjustments during manufacture or changes due to aging or environmental conditions.

The present finder pattern efficiently uses label space because the area occupied by the finder spots is not large compared to the information bearing portion of the label. Additionally, the detected finder pattern spots provide information about label magnification, tilt and other distortions, which is used in decoding the two dimensional data array in order to compensate for such adverse effects.

DETAILED DESCRIPTION

Figure 1:
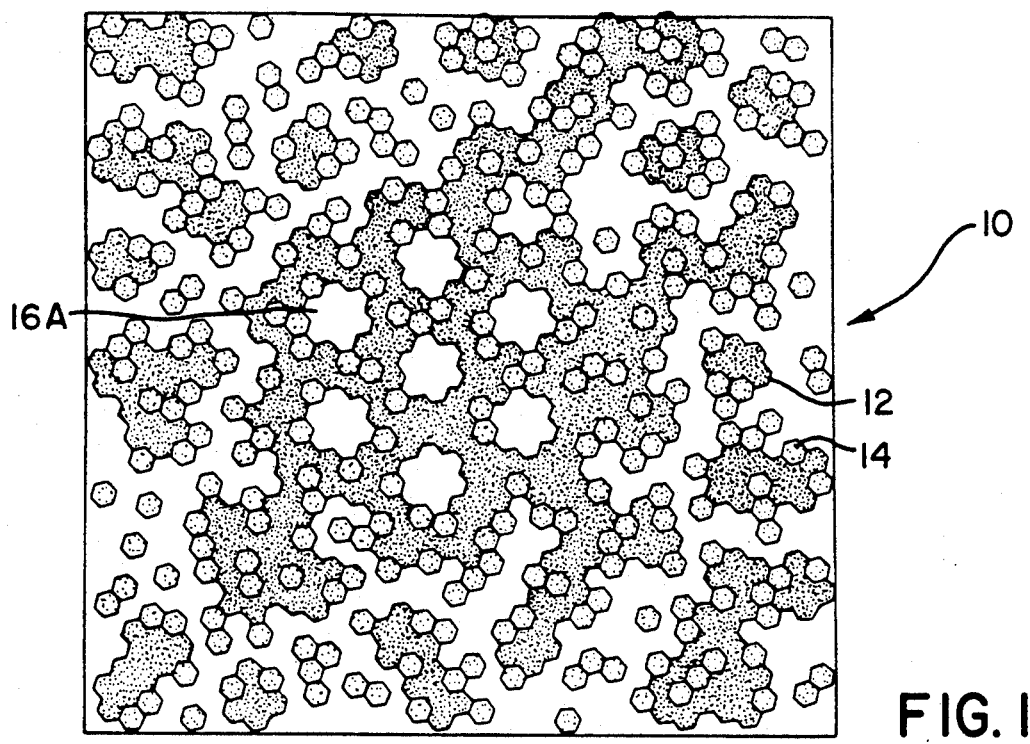
FIG. 1 illustrates a multiple resolution optically encoded label including a finder pattern in accordance with the present invention.

A multiple resolution optically encoded label 10 is shown in FIG. 1. The label 10 includes 7 white finder spots, such as spot 16a. Data is encoded in the label in the form of low resolution encoded cells, such as cell 12 and high resolution encoded cells, such as cell 14.

Figure 2:
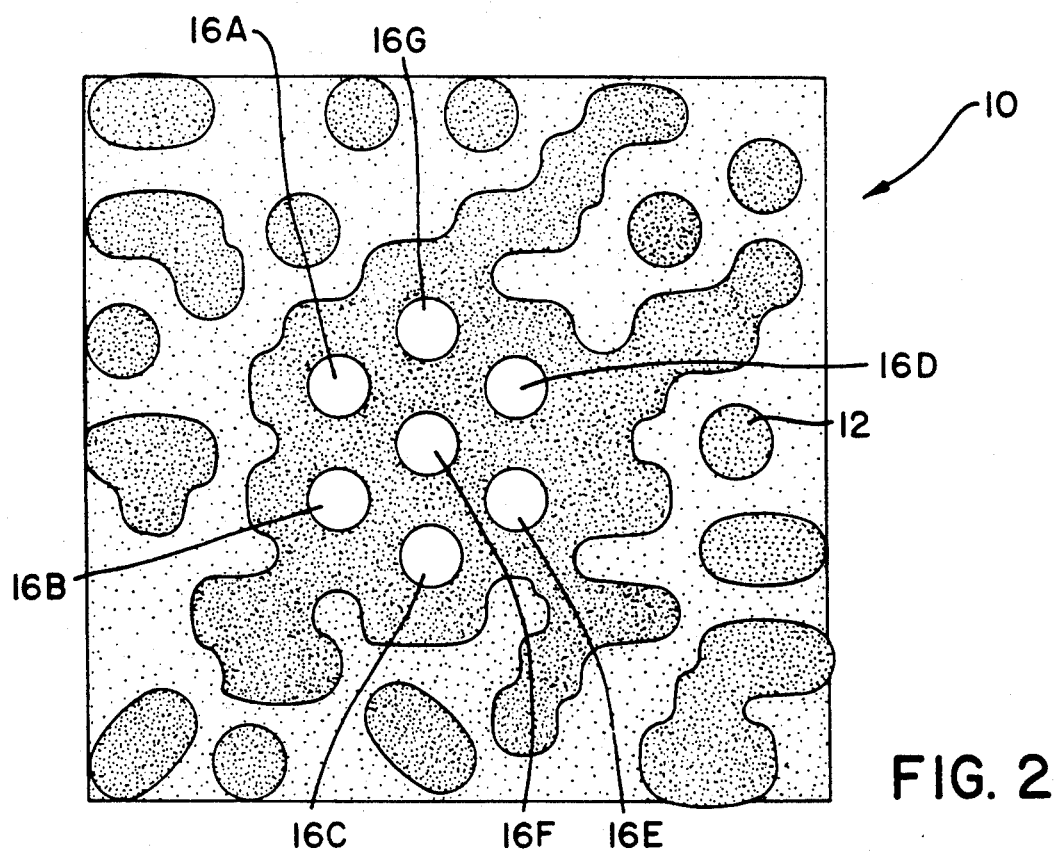
FIG. 2 shows a multiple resolution optically encoded label viewed at low resolution illustrating a finder pattern in accordance with the present invention.

At low resolution, the label of FIG. 1 appears as shown in FIG. 2. At low resolution, the high resolution encoded cell 14 is not visible. However, at low resolution, the low resolution data cell 12 is visible and appears as a dark cell. Seven finder pattern spots 16a through 16f, viewed at low resolution, are visible as light cells.

Figure 3A:
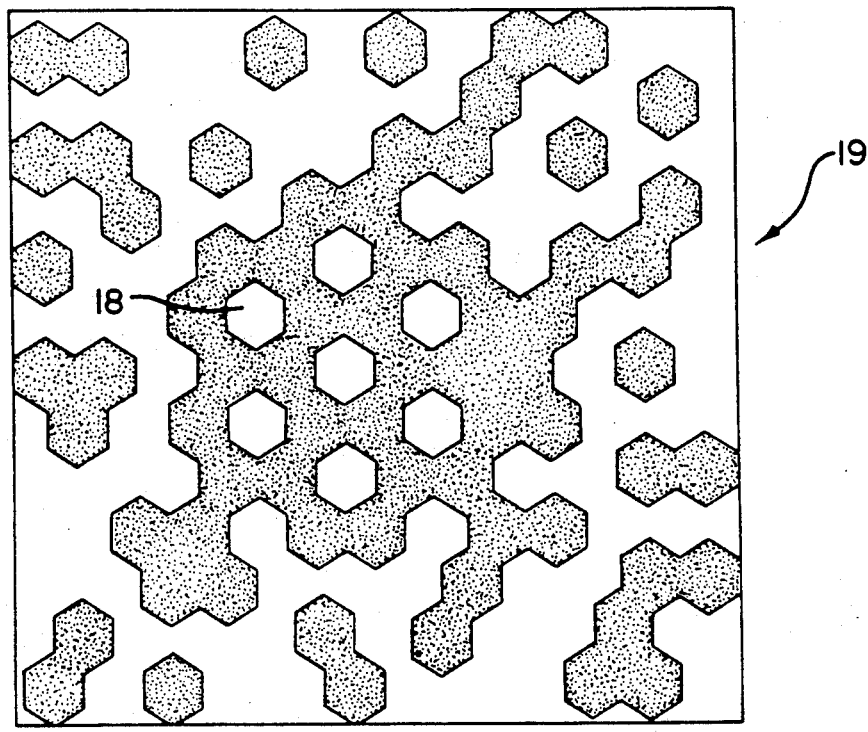
FIGS. 3a and 3b show various cell shapes of a multiple resolution optically encoded label illustrating a finder pattern in accordance with the present invention.
Figure 3B:
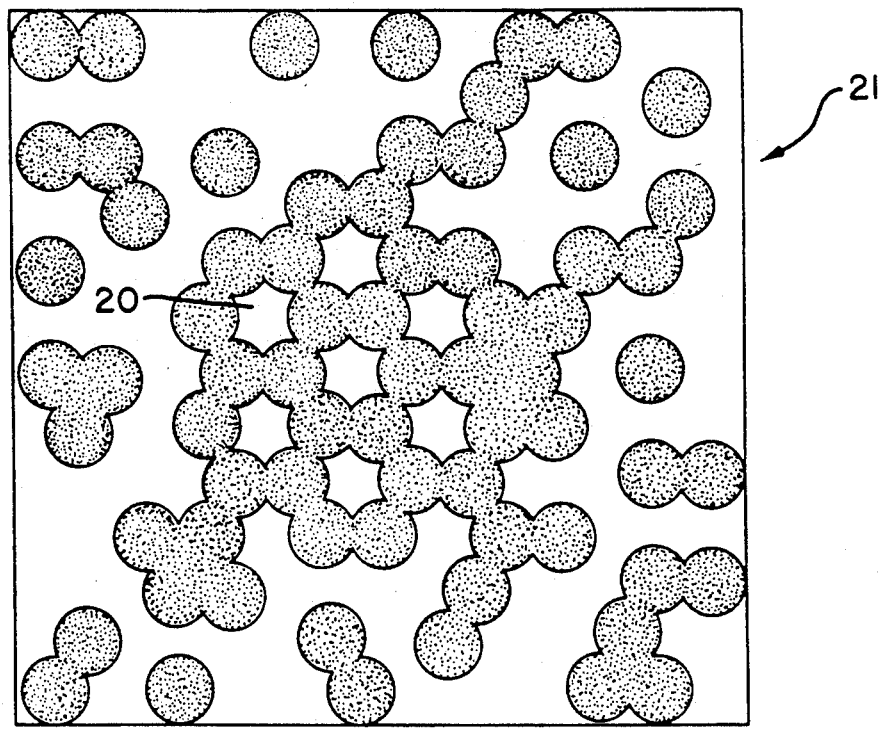

In FIG. 3a, a label 19 is illustrated using hexagonally shaped large data cells for encoding low resolution information. A finder spot 18, one of 7 finder spots, is also shown having a generally hexagonal shape. In FIG. 3b, a label 21 having low resolution encoded information in the form of circular cells as shown. In this case a finder spot 20, one of 7 finder spots, is formed by the 6 circular low resolution dark data cells surrounding finder spot 20.

Figure 4A:
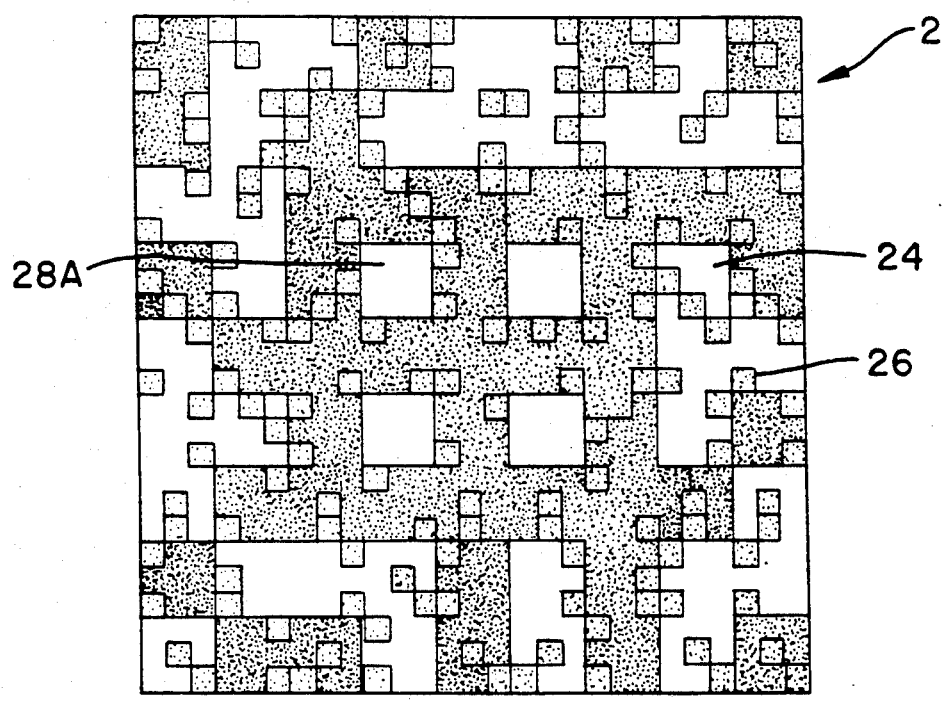
FIG. 4a illustrates a multiple resolution optically encoded label using a generally rectangular geometric array of rectangular finder spots in accordance with the present invention.

An alternative embodiment of a multiple resolution optically encoded label 22 is shown in FIG. 4a. The label 22 contains low resolution encoded data cells, such as cell 24, and at the same time includes high resolution encoded data cells, such as cell 26.

Figure 4B:
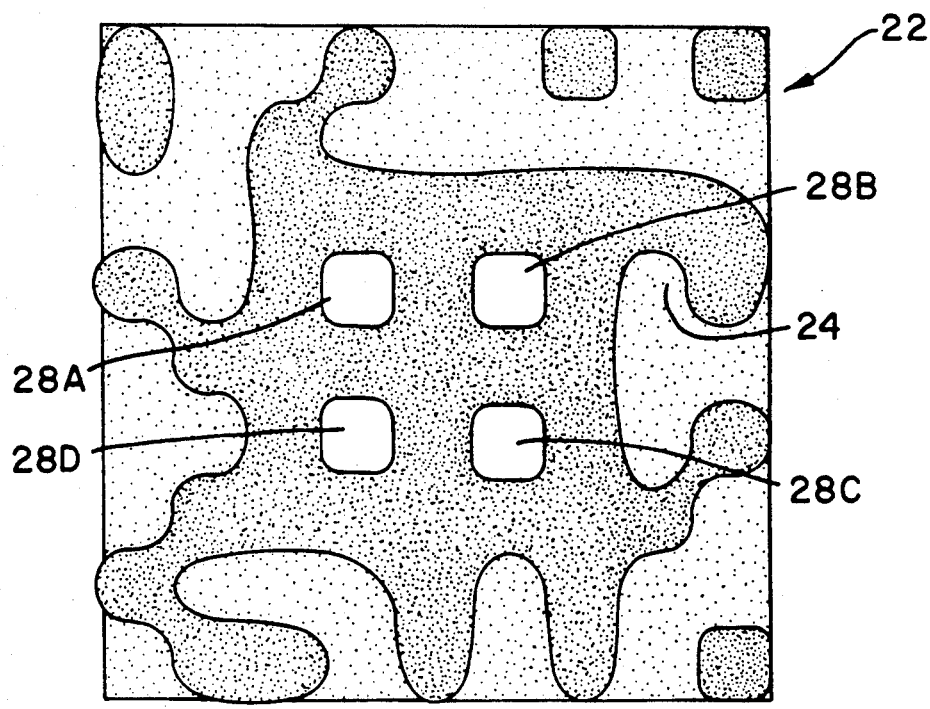
FIG. 4b is a multiple resolution optically encoded label of FIG. 4a viewed at low resolution embodying a finder pattern in accordance with the present invention.

When viewed at low resolution, the label of FIG. 4a appears as shown in FIG. 4b. At low resolution, the high resolution data cell 26 is not visible. However, at low resolution, the low resolution data cell 24 is visible and appears as a light cell. Four finder pattern spots 28a through 28d, viewed at low resolution, are visible as light cells.

Figure 5A:
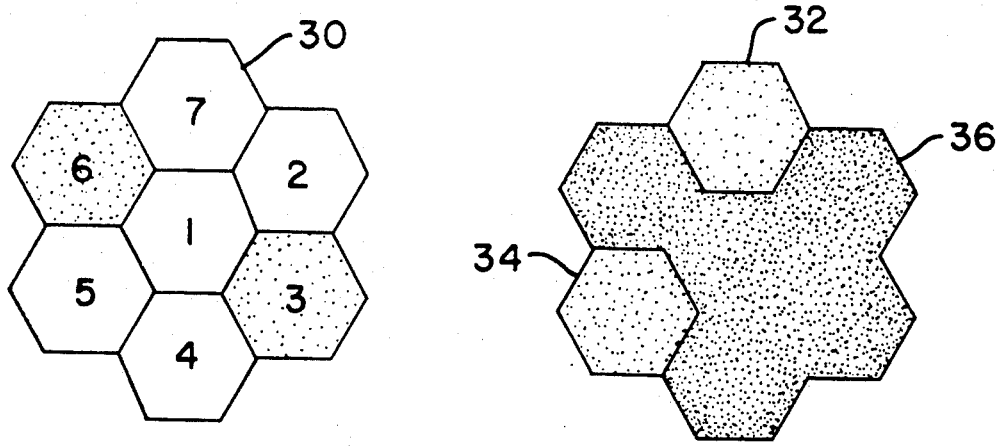
FIGS. 5a, 5b, and 5c illustrate high resolution encoding techniques which may be used a multiple resolution label in conjunction with the present invention.

A preferred embodiment of an optically encoded label illustrating the manner in which high resolution data is encoded on the same label area as low resolution data, is shown in FIG. 5a. A large cell 30 contains two contrasting small cells, or subcells. The small cells can be in any of the positions 1 through 7. High resolution information is encoded by the position of the two contrasting small cells within the large cell 30. In particular, cell 3 and cell 6, have a contrasting optical property as compared to the large cell 30. Similarly, cells 32 and 34 have a contrasting optical property as compared to the large cell 36, but are placed at different small cell positions.

Specifically, there are 21 possible combinations for placement of two cells out of 7 having a contrasting optical property. Therefore, each low resolution large cell can encode an additional 4.39 bits of information (logarithm base 2, of 21).

The small cells within a large cell should be limited in size and number to keep the optical property of the large cells from changing appreciably. Therefore, during processing of the large data cells, only the large cell low resolution image data is processed, at which time the small cell high resolution image data is not visible so as to not interfere with the decoding of the large cell low resolution image data.

To maximize the readability of the high resolution information, cells 3 and 6 could be made black while remainder of the large cell be made white. However, at low resolution, it is desired that the low resolution cell 30 appear as though completely white or black. Therefore, it is preferable that cell 3 and cell 6 be somewhere intermediate on the grey scale between black and white in order to aid in the reliable reading of low resolution data.

For example, large cell 36 will appear as a black cell at low resolution. High resolution small cell 32 and small cell 34 have a contrasting optical property somewhere intermediate on the grey scale between black and white. Thus, the contrasting optical property of the small cells should be sufficient to permit the reading of high resolution data, while not appreciably changing the optical property of the large cell 36 when viewed at low resolution.

Figure 5B:
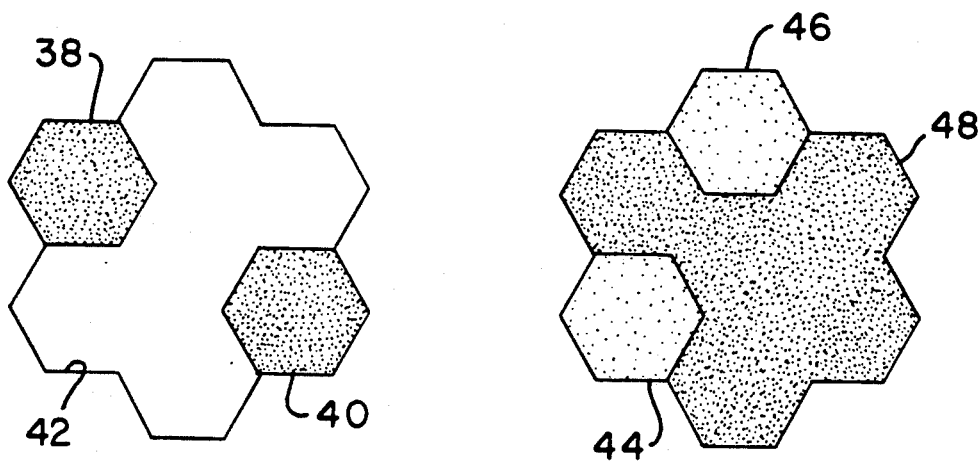
Figure 5C:
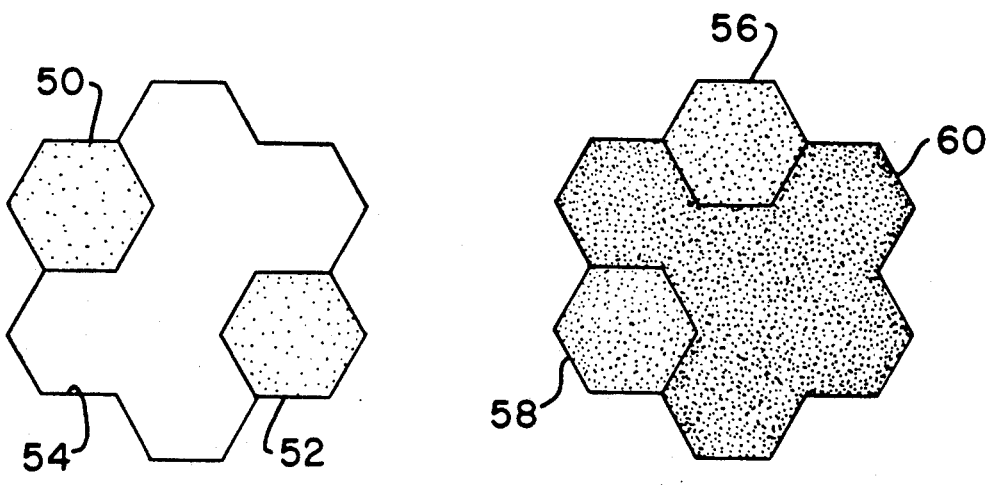

FIG. 5b shows how the optical property of the small cells may be further optimized for certain situations. In FIG. 5a the contrasting optical property of the small cells 3, 6, 32, 34 are the same grey value for large white cell 30 as for large dark cell 36. However, as shown in FIG. 5b, it may be desirable to use light grey small cells 44 and 46 within a large dark cell 48, and dark grey small cells 38 and 40 within a large cell 42 in order to increase the contrast of the small cell to the large cell. Conversely, as shown in FIG. 5c, if it is desired to increase the contrast between large cells, i.e. the optical property of large cell compared to other large cells, then dark grey small cells 56 and 58 may be used within a large dark cell 60, and light grey small cells 50 and 52 may be used within a large light cell 54. The choice of grey scale optical value of the small cells is a balance between the ease of reading the high resolution data cell, or the ease of reading the low resolution data cell.

In any event, the position of the small cells within the large cell encodes the high resolution information, while the optical property of the large cell viewed at low resolution, including the contribution of the small cells, determines the value of the large cells. Since there are always two small cells within each of the large cells for all values of encoded data, the optical property of the large cells viewed at low resolution does not change appreciably for different encoding of the small cell high resolution data.

The total information content of one large cell includes 4.39 bits of small cell information plus 1 bit of large cell information, or a total of 5.39 bits, compared to the 7 bits which could be encoded if only a high resolution black and white system was used. Due to the enhanced data reliability of the large cells and the consequent reduced need for error correction, the data density achieved by the multiple resolution optical encoded label of the present invention is comparable to the data density of prior art high resolution systems, while providing the additional advantages of multiple resolution encoding.

Other embodiments of multiple resolution encoding is shown in FIGS. 8a through 8f. The high resolution information is encoded within low resolution data cells based on the position, number, shape, orientation, optical property, or size of the low resolution data cell.

Figure 8A:
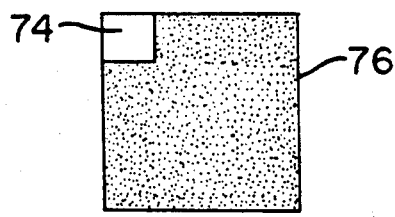
FIGS. 8a through 8f illustrate alternative embodiments of multiple resolution optically encoded data cells which may be used in conjunction with the present invention.
Figure 8B:
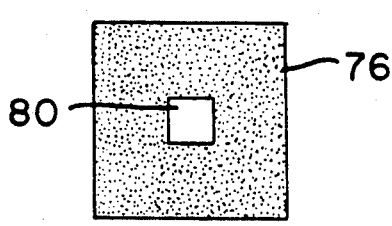
Figure 8C:
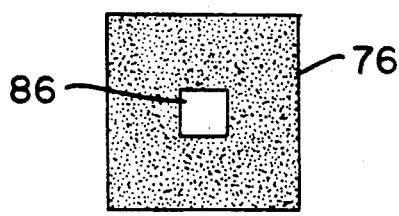
Figure 8D:
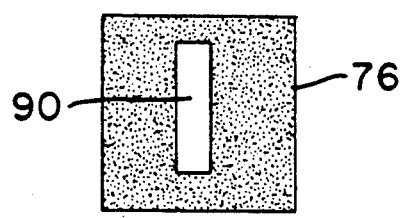
Figure 8E:
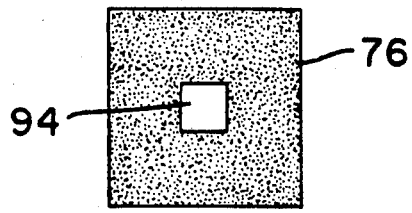
Figure 8F:
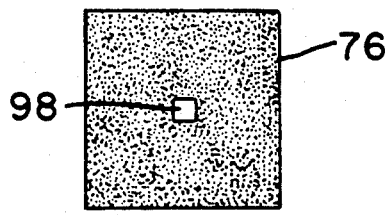

For example, FIG. 8a shows how high resolution information can be encoded by placing a small contrasting cell 74 at different cell position 78 within the large low resolution cell 76. FIG. 8b shows how high resolution information can be encoded by placing varying numbers of small contrasting cells, i.e. a single cell 80 or two small cells 82 and 84 within a large low resolution cell 76. FIG. 8c shows how high resolution information can be encoded by placing small contrasting cells of different shapes within the large cell 76, such as square cell 86 or circular cell 88. FIG. 8d shows how high resolution information can be encoded by changing the orientation of a small contrasting cell 90 within the large low resolution cell 76, i.e. at a 45 degree angle shown by the position of cell 92. FIG. 8e shows high resolution information encoded by placing small contrasting cells of different optical properties such as light cell 94 or grey cell 96 within the large low resolution cell 76. Finally, FIG. 8f shows high resolution information encoded by placing a contrasting cell of different size such as a small square 98 or a larger square 100 within the large low resolution cell 76. Various combinations of the foregoing methods of encoding may be used, as for example, by varying the number of small cells and at varying positions.

Figure 6A:
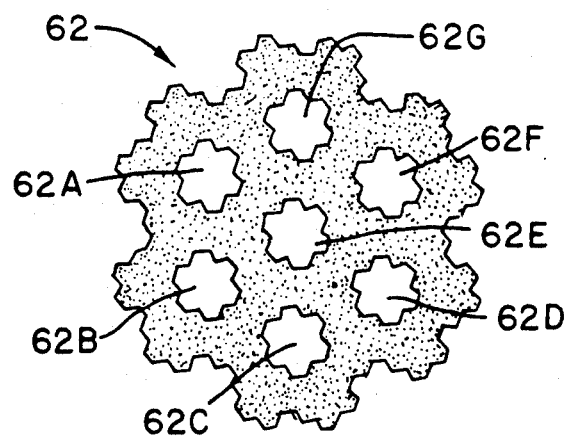
FIGS. 6a, 6b, and 6c illustrate various forms of finder patterns in accordance with the present invention.
Figure 6B:
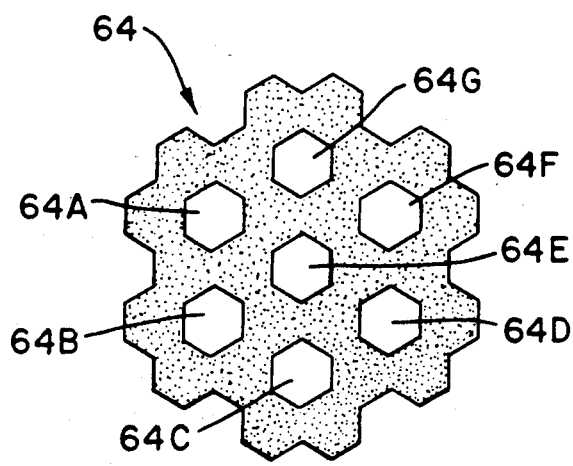
Figure 6C:
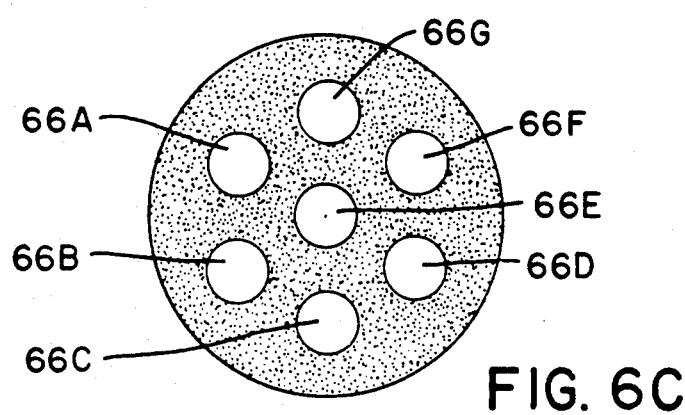

As will be recalled, the finder pattern consists of an array of 7 spots arranged in a hexagonal geometric pattern. Specifically, FIG. 6A shows the finder pattern 62 for use in conjunction with the present embodiment, when viewed at low resolution. The finder pattern 62 consists of 7 spots, 62a through 62g, which are at the 6 points at the vertices of a regular hexagon plus the center point. Alternative finder patterns are shown in FIG. 6b wherein a finder pattern 64 consists of 7 hexagonal spots 64a through 64g, and in FIG. 6C wherein the finder pattern may alternatively consist of 6 circular spots 66a through 66g. A finder pattern, which is composed of a predetermined geometric array of large data cells provides a pattern which is easy to distinguish from common backgrounds, provides some label orientation information, and also provides large cell to large cell spacing information useful in the decoding process.

Figure 10:
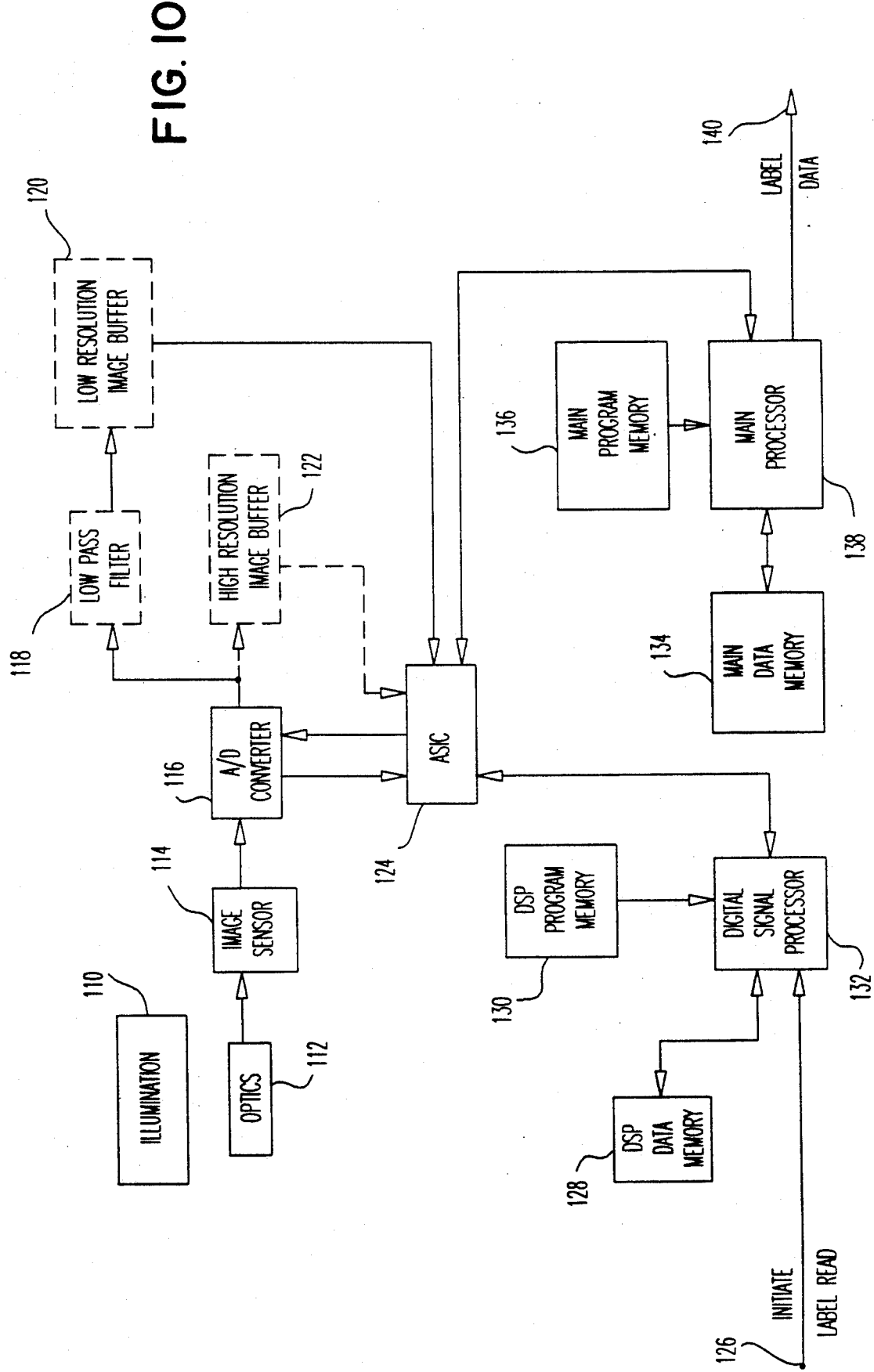
FIG. 10 is a block diagram of a multiple resolution optically encoded label reader embodying the present invention.
Figure 11:
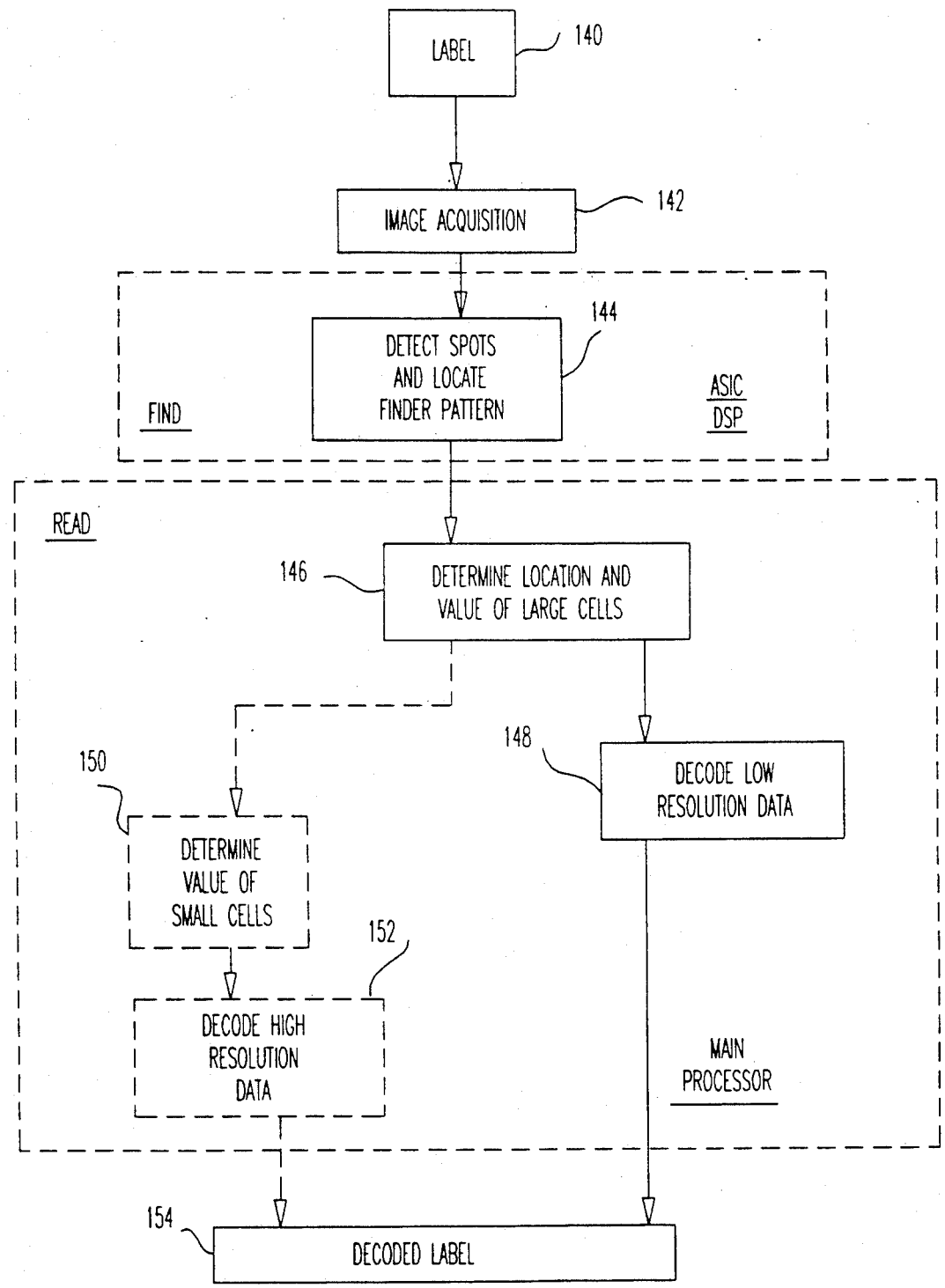
FIG. 11 is flow chart representation of the method of finding and reading a multiple resolution optically encoded label in accordance with the present invention.

An apparatus for processing a multiple resolution optically encoded label is shown in FIG. 10. The overall method illustrated in the flow chart of FIG. 11. As shown in FIG. 11, the processing of label 140 to provide a decoded label output 154 is divided into two main processes: a find algorithm, and a read algorithm. An image which may include an optically encoded label is acquired by image acquisition subsystem 142. The spots are detected and the finder pattern is located at step 144. The finding algorithm is carried out by two programmable hardware elements, a digital signal processor (DSP 132 in FIG. 10) and an application specific integrated circuit (ASIC 124 in FIG. 10). A DSP suitable for use in the present invention is the ADSP 2101 available from Analog Devices, Norwood, Mass.

After the label has been located, i.e. found within the image buffer memory, the location and value of the large cells is determined at step 146, and the low resolution data is then read out and decoded at step 148. If the label also contains high resolution data, then the value of the small cells is determined at step 150. The high resolution data read out and decoded at step 152. The read algorithm is carried out by a separate processor (main processor 138 in FIG. 10). The main processor 138 may be implemented in a high speed microprocessor such as the TMS320C30 available from Texas Instruments, Dallas Tex.

FIG. 10 is a block diagram of a multiple resolution reader system implementing the flow chart of FIG. 11. The image acquisition system comprises an illumination source 110, and suitable optics 112 for forming an image containing the image of a multiple resolution optically encoded label on image sensor 114. Thereafter, analog to digital converter 116 digitizes the acquired image. If only low resolution data is required, then a low resolution image acquisition system is used. In a low resolution reader, the output of the analog to digital converter 116 would go directly to a low resolution image buffer 120. Alternatively, if both high resolution and low resolution data are required, then a high resolution image acquisition system is used. In a high resolution reader, the output of analog to digital converter 116 would be stored in a then required high resolution buffer 122. A low resolution image of the label, to be used for processing purposes, would be created by down sampling or by using a low pass filter 118 to remove image details thereby creating a low resolution image for storage in low resolution image buffer 120. The low resolution image in buffer 120 is used for label finding and for low resolution data decoding.

The image acquisition subsystem is controlled by ASIC 124, which is in turn controlled by digital signal processor (DSP) 132. DSP 132 has an associated DSP program memory 130 and DSP data memory 128. A separate processing element, main processor 138 and its associated main program memory 136 and main data memory 134 is provided for reading the label.

In operation, a signal on terminal 126 to initiate label reading is provided to DSP 132. DSP 132 and ASIC 124 control the image acquisition system and process the acquired image so as to find, or locate, a multiple resolution optically encoded image. The location of the acquired image is transferred to main processor 138, where the acquired image is processed to read and decode the encoded label data for output on terminal 139.

Figure 12:
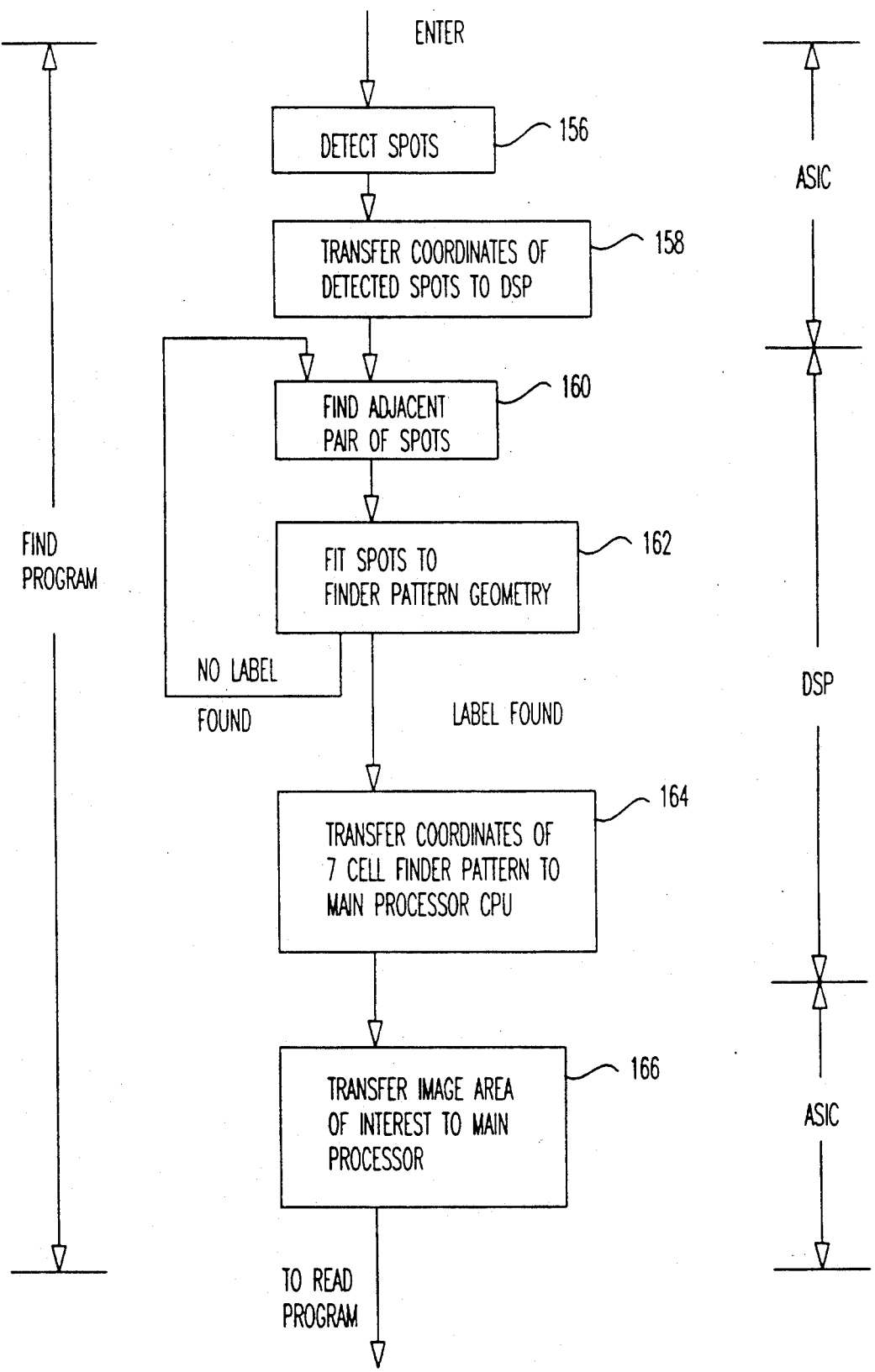
FIGS. 12 and 12a is a flow chart representation of the program for detecting a finder pattern in accordance with the present invention.

FIG. 12 illustrates the algorithm for finding a multiple resolution optically encoded label which is stored somewhere within the field of view of the image acquisition system buffer memory. The find program is carried out by coordination between the ASIC 124 and the DSP 132 (from FIG. 10).

The first step in the finding algorithm of FIG. 12 is to detect spots at step 156, looking for finder spots. Spots, as characteristic formations, are readily detected and are distinguishable from typical background clutter. The spot detector examines each pixel in the low resolution image buffer looking for pixels of one chosen optical value surrounded by pixels of a contrasting optical value (e.g. light spots surrounded by dark spots).

Figure 9:
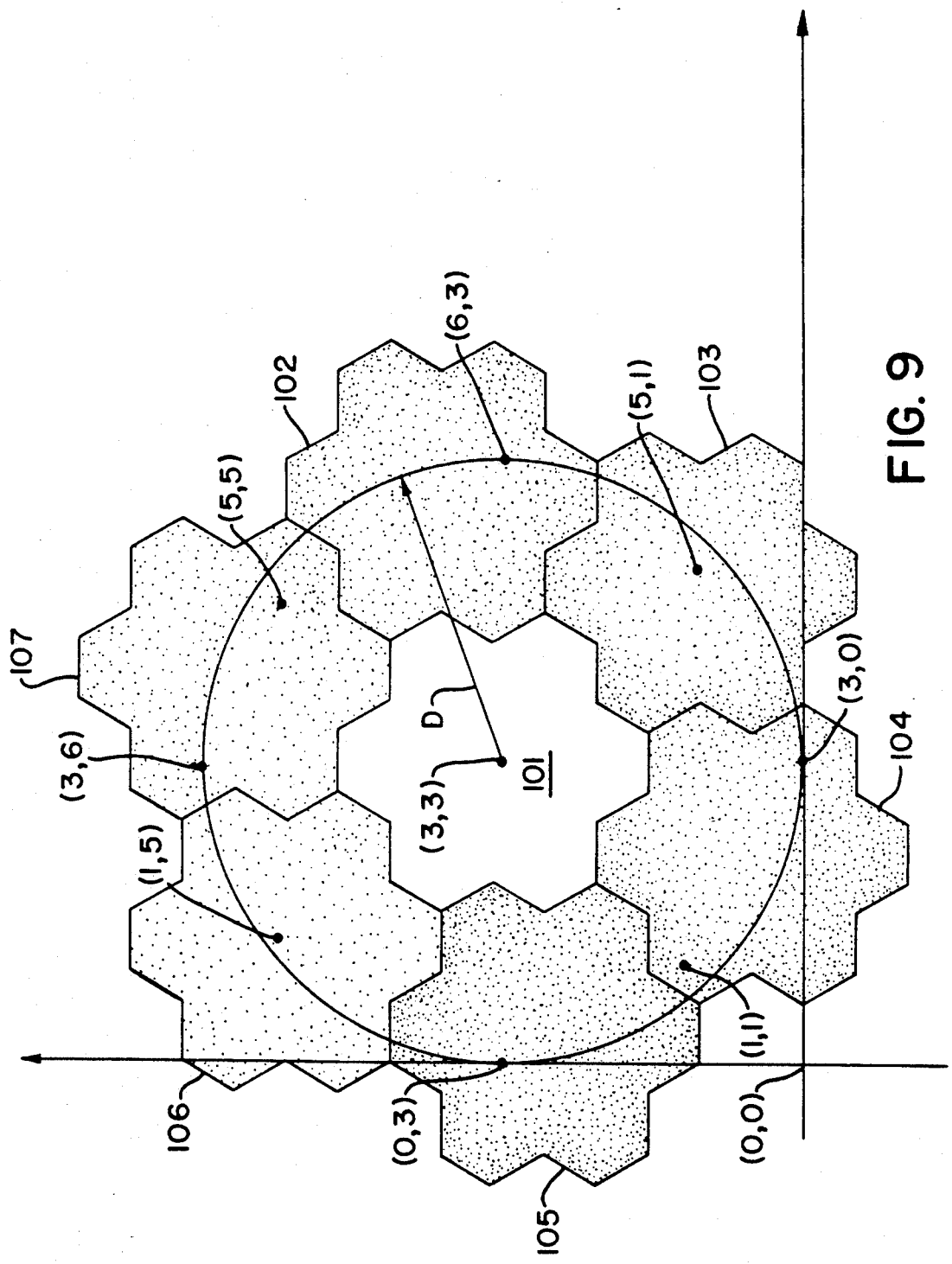
FIG. 9 is a detail illustration of a single finder pattern spot for use with the present invention.

With reference to FIG. 9, the spot detector individually compares the value of a chosen pixel, such as at coordinate position (3,3) with the values of selected surrounding pixels that are approximately one large cell, i.e. one spot diameter D away from the chosen pixel, such as (6,3) which is on a circle of radius D, and (5,1) which is close to but not exactly on a circle of radius D. Thus, the 8 pixel values at the coordinate positions shown in FIG. 9, which are approximately a distance D from the center of finder spot 101 are compared with the pixel value at the center of spot 101. In this embodiment, spots are equals to one large data cell 101.

The spot detector 156 indicates that a spot has been found if 7 of the 8 pixels approximately one cell diameter D away from the center of spot 101 at coordinates (3,3), are of contrasting optical value. Thus, only spots of the correct size (one large cell size) survive the spot detector. Text, bars, constant backgrounds, or anything else of a non-spot nature is not detected. The process is repeated over the entire area of the image memory on a pixel-by pixel basis. As the process is carried out, the coordinates of those pixels which pass the spot detector test are transferred to the DSP 132 (FIG. 10) at step 158 in FIG. 12.

Figure 12A:
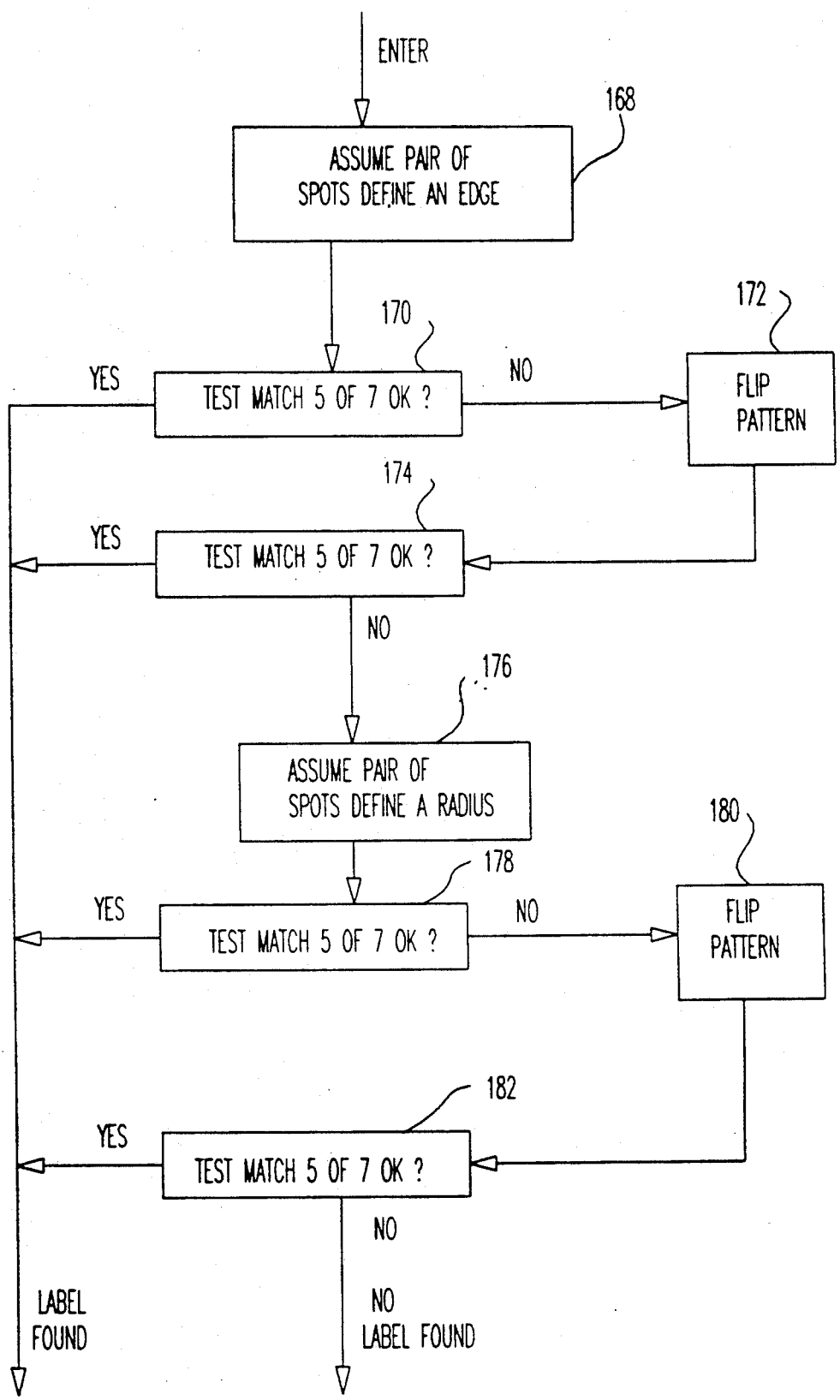

As the DSP accumulates detected spots, each pair of spots is examined in the DSP to find an adjacent pair of spots at step 160. That is, any two spots which are approximately the proper distance apart, i.e. which correspond to the predetermined distance between finder spots, constitute a potential pair of spots at step 160. Thereafter, the DSP will attempt to fit the remaining spots to the known predetermined geometric arrangement of the finder pattern at step 162. Further detail on the steps for fitting detected spots to the finder pattern geometry at step 162 is illustrated in the flow chart program of FIG. 12a.

The fitting algorithm is based on the observation that any pair of spots of the 7 spot finder pattern constitute either an edge or a radius of the finder pattern. The first step is to assume that the two adjacent spots define an edge of a regular hexagon at step 168 in FIG. 12a. Then, at step 170 all the other surrounding spots which had been detected by the spot detector will be compared to the known geometric arrangement of the finder pattern, i.e. a test pattern. If the test match indicates that there is a match, i.e. 5 out 7 potential finder spot locations match actual detected finder spots, at step 170, then the program exits indicating that a label has been found.

If the test match does not indicate a match at step 170, then the test pattern used for comparison at step 172 is flipped. Flipping the test pattern corresponds to an assumption that the assumed pair of detected spots do define an edge, but that the remainder of the finder spots fall opposite the assumed test pattern as a mirror image. In the latter case, only 2 out of 7 detected spots, i.e. the adjacent pair of spots, will match the test pattern. Flipping the test pattern at step 172 and again testing whether or not 5 of the 7 spots match the test pattern at step 174 will resolve the ambiguity. If 5 of the 7 spots match the flipped test pattern at step 174, then a label is considered found.

If, on the other hand, 5 out of 7 of the spots did not match the test pattern, then an assumption is made that the pair of spots define a radius at step 176. The actual spots detected are again tested to match 5 out of 7 spots to the known geometric arrangement of the finder pattern at step 178. If 5 out of 7 of the spots match, then the label is considered found. However, if the test fails, then the test pattern is flipped at step 180 and again tested for a match at step 182. Flipping the test pattern corresponds to an assumption that the assumed pair of detected spots do define a radius, but that the assumed test pattern of the finder spots is a mirror image of the actual finder pattern. In the latter case, only 4 out of 7 detected spots will match the test pattern. Flipping the test pattern at step 180 and again testing whether or not 5 of the 7 spots match a predetermined test pattern at step 182 will resolve the ambiguity. If 5 out of 7 match at step 182, the label is considered found. However, if all test matches 170, 174, 178, 182 fail, then no label is considered found.

Returning to the flow chart of FIG. 12, if no label is considered found at step 162, then the program is reentered at step 160 to find a different pair of adjacent spots. The process is carried out continuously as the coordinates of additional detected spots are transferred to the DSP at step 158.

Eventually, when a label is found, the coordinates of the 7 cell finder pattern are transferred to the main processor at step 164. The ASIC 124 (FIG. 10) is then commanded to transfer the image area of interest surrounding the 7 cell finder pattern to the main processor at step 166, and the read program, stored in the main processor program memory, is entered. The foregoing method of finding allows rapid and reliable finding of a target and label, even when a large amount of area must be processed.

Figure 7A:
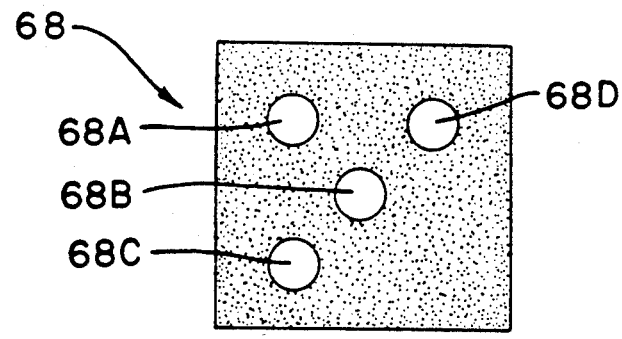
FIGS. 7a, 7b, and 7c illustrate various alternate forms of finder patterns in accordance with the present invention.
Figure 7B:
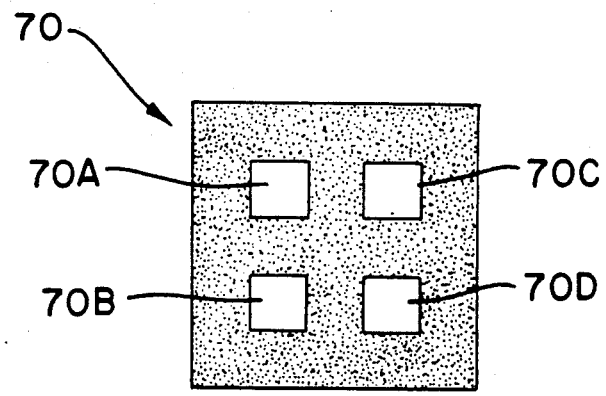
Figure 7C:
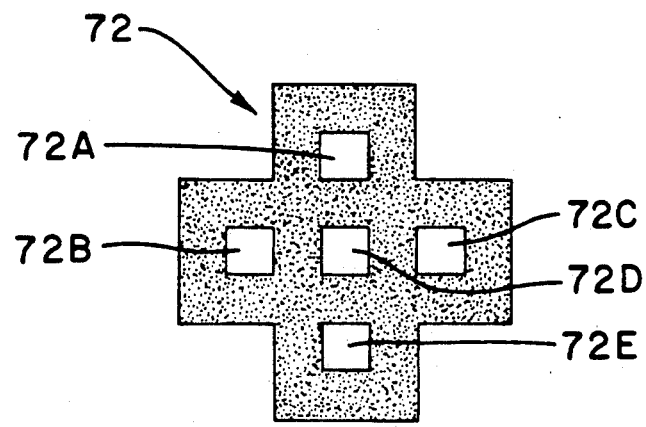

Other types of finder patterns consisting of an array of spots in a predetermined geometric pattern may be used. FIGS. 7a, 7b, and 7c illustrate a variety of alternative finder patterns. Specifically, in FIG. 7a an asymmetrical finder pattern 68 consisting of 4 circular spots 68a through 68d is illustrated. A finder pattern 70 consisting of 4 square spots 70a through 70d arranged in a square geometric pattern is shown in FIG. 7b. Yet another alternative embodiment of a finder pattern is shown in FIG. 7c wherein finder pattern 72 consists of 4 square spots 70a through 70e arranged in a symmetrical cross pattern. The finder pattern can be asymmetrical, or symmetrical about a single axis as in FIG. 7a, which also provides non-ambiguous orientation information regarding the found label. The geometric arrangement of the finder pattern need only be predetermined so that detected spots can be matched to the predetermined pattern, and that the location of any one spot of the finder pattern can be determined by geometry from some or all of the other spots of the finder pattern. The geometric pattern of the finder spots can be regular, symmetrical, asymmetrical, or pseudorandom.

Once the label has been found, the main processor 138 in FIG. 10 reads the label as follows:

1) Construct a 19 point large cell center sampling pattern for sampling large cell centers.

2) Determine the location of the large cell centers using the maximum standard deviation of the 19 point large cell center sampling pattern.

3) Decode large cell information.

4) Determine the position of the small cells within the large cells from the known location of the large cell centers.

5) Decode the small cell information.

When both high resolution and low resolution data is present, the reader would first process the low resolution data to find the coordinates of the centers of the large data cells. Once the centers and the optical values of the large data cells are determined, the high resolution data cells may be located relative to the low resolution data cells and then directly read out. The process for reading the large cell low resolution data is the same whether small cell high resolution data is present or not.

Figure 13A:
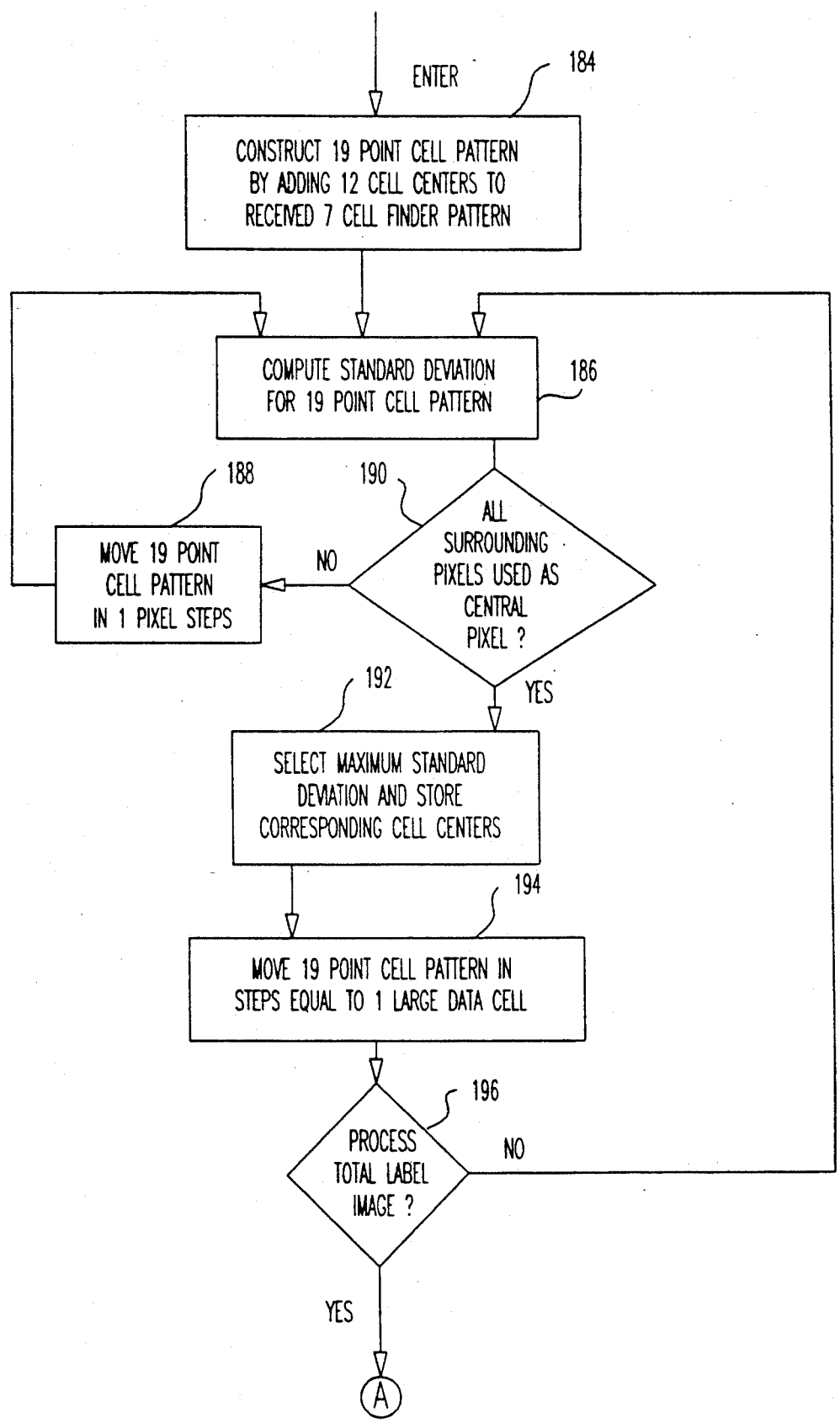
FIGS. 13a and 13b flow chart illustrating the program using detected finder pattern spots for reading both high resolution data and low resolution data encoded on a multiple resolution optically encoded label in accordance with the present invention.
Figure 13B:
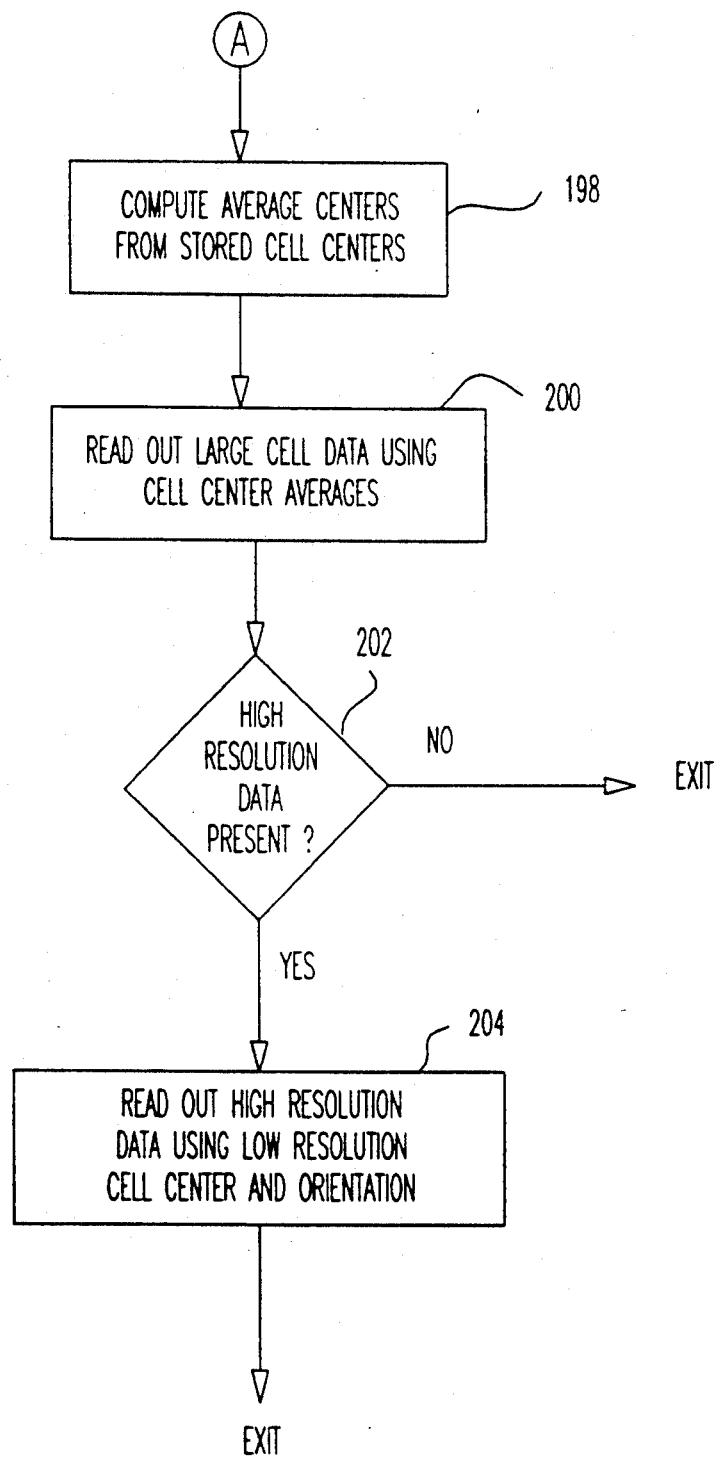
Figure 14A:
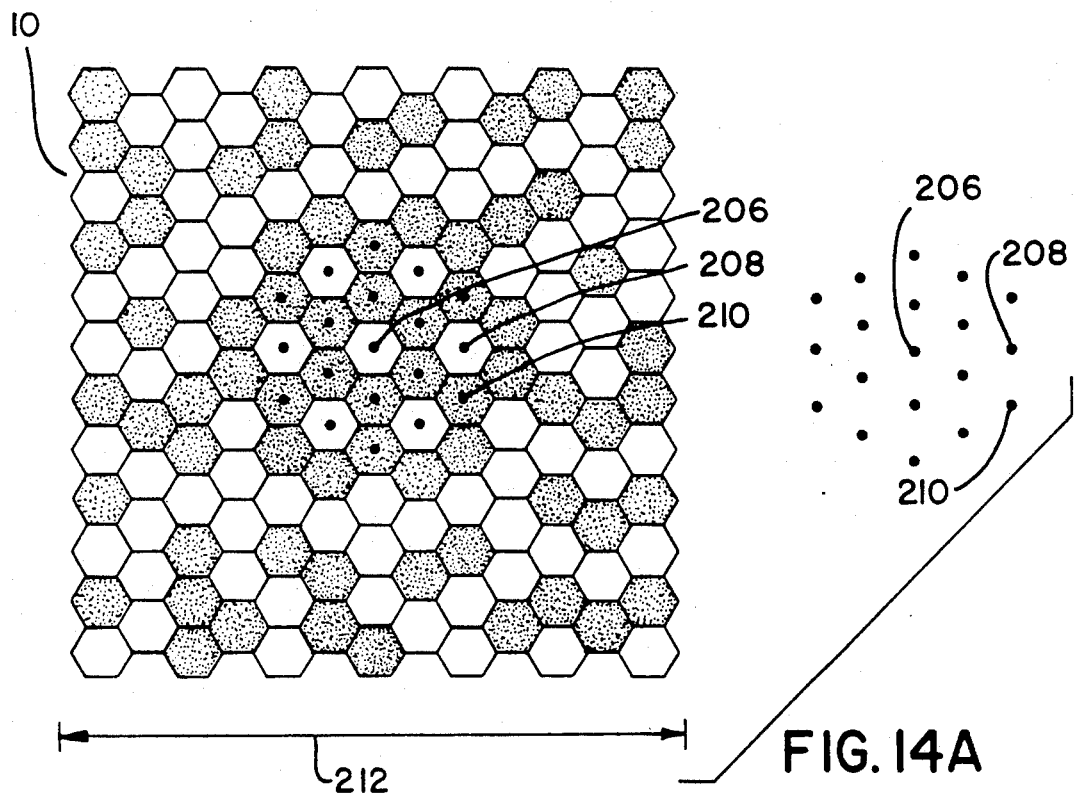
FIGS. 14a and 14b illustrate the process using detected finder pattern spots for reading low resolution data cells of a multiple resolution optically encoded label in accordance with the present invention.

The read program which is carried out by the main processor is illustrated in the flow chart of FIGS. 13a and 13b. The first step in reading the label is to construct a 19 point large cell center sampling pattern based on the known geometry of the array of large cells contained in a label as shown in FIG. 14a. The 19 point large cell center sampling pattern is comprised of a series of coordinates that are relative to and surrounding any arbitrary central pixel 206. The geometry of the 19 point large cell center sampling pattern is constructed such that if the central pixel 206 is the center of a large cell, each of the other points 208, 210 in the 19 point large cell center sampling pattern will also be in the center of the large cells surrounding the central pixel 206 of the central large cell.

In order to construct the 19 point large cell center sampling pattern, the accurate location of the 7 finder spots are first determined. Accurate locations (e.g. central pixels) of the finder pattern spots are determined by searching the area in the immediate vicinity of each spot identified by the spot detector for a pixel grouping of maximum value. If the number of spots identified by the finder is less than the expected number of spots, accurate locations of the identified spots are first determined, then using the known expected geometry of the finder and label, the locations of the missing finder spots are computed.

Starting from the actual geometry of the detected and/or computed 7 finder spots, and the expected geometry of the label, 12 additional large cell center coordinates are computed. The constructed 19 point large cell center sampling pattern is shown in FIG. 14a superimposed on the data array as well as shown separate from the data array for clarity.

The 19 point large cell center sampling pattern is used to locate the center of each large cell by choosing a center pixel, and then taking the standard deviation of the center pixel and all of the surrounding pixels determined by the sampling pattern. If the sampling pattern is centered on the cells, the standard deviation will be high. As the sampling pattern is moved away from cell centers, the standard deviation becomes low.

The standard deviation is a statistical measure of the differences among a set of values. The standard deviation computation is well known in the field of mathematics. Briefly, if all numbers in a set are approximately equal to each other, the standard deviation is very low. If half the numbers in a set are at some minimum and the other half are at some maximum, the standard deviation will tend to be highest.

The standard deviation for the 19 point cell center sampling pattern will be maximum when it is positioned near the center of the large data cells, because at least some of the 19 data cells covered will be of one optical value, while others will be of the opposite optical value.

Conversely, the standard deviation for the 19 point cell center sampling pattern will be minimum when it is positioned near the edges of the large data cells, where optical values tend to be grey in the transition areas between large data cells.

In operation, the central pixel 206 of the central finder spot or large cell, is used as the starting point of the determination of the locations of all the large cell centers. The sampling pattern is overlaid at this position, and the standard deviation of all pixels of the sampling pattern is computed at step 186. Additional sampling pattern standard deviations are computed using the sampling pattern where each of the pixels surrounding the original central pixel are used as the central pixel in step 188 until all surrounding pixels are used as the central pixel of the 19 point cell center sampling pattern at step 190. The goal is to maximize the standard deviation of the sampling pattern within a small neighborhood of pixels. When the standard deviation is maximized, the coordinates of all points in the sampling pattern at the maximized location are recorded (these are expected centers of large cells). One standard deviation maximization provides a list of coordinates for possible large cell centers for all of the 19 points in the large cell center sampling pattern. Thus, the 19 point cell center pattern position having the maximum standard deviation will be selected as the true centers of the 19 data cells at step 192. The 19 corresponding cell centers are stored in memory at step 192.

The process is then repeated for the entire label, each time starting with an unsearched central cell location adjacent to the cell where the standard deviation was greatest.

In each new position, the steps of maximizing the standard deviation at steps 186 and 188 is repeated. The result will yield another set of 19 cell centers based on the new computed maximum standard deviation. The process is repeated for each large data cell until the entire label image area has been processed at step 196. The net result of this process is a large quantity of coordinate values for the large cell centers. The final step in determining the cell centers is to take the average of coordinates recorded for each cell at step 198. These are the best cell coordinate estimates.

Before reading the data stored in the large cells, a histogram of all grey values at the cell center coordinates is taken in order to determine a threshold level between light and dark cells. The value of each large cell is then determined by comparing it to the computed threshold value. Once the centers of the large cells are known and the optical threshold level is determined, it is a relatively simple matter to read out the pixel values using the computed cell center averages at step 200.

If no high resolution data is present, the program exits at this point. If however high resolution data is present, then the high resolution data is read out at step 204. Since the center of the low resolution large cell has been accurately determined, position of the high resolution cells can be determined relative to the computed center and read out directly. This method of dead reckoning from the computed large cell center to find the small cell centers is practical because of the small distances between the center of the large cell and any of the small high resolution cells.

It is noted that the finder pattern will determine the orientation of the label along one of six potential axis. The ambiguity is resolved by reading out the data in all six directions. The encoding will only permit a successful decode in the correct orientation. Therefore, decoding is attempted in all six directions until a successful decode is achieved.

In the preferred embodiment, there are 150 large cells. The finder target requires 31 cells, leaving 119 cells (or bits) for low resolution encoding of high priority data. Ultimately, the encoding capability of the 119 low resolution data cells is approximately 5 to 20 characters, depending the type of error correction used and the number of bits per character. In general, since the image acquisition system performs better with larger optical features, i.e. large cell sizes, less error correction is required.

High resolution information is encoded on top of the 119 low resolution information large cells, and also on the 24 large dark cells surrounding the 7 light finder target spots. The actual finder target spots are not used for high resolution information due to the critical nature of the finder spots in the label finding process. Therefore, the total large cells available for high resolution encoding is 119 plus 24 or 143 total. At 4.39 bits per large cell, the high resolution cells provide an additional 627 bits available for data encoding. For simplified encoding, each large cell may encode 4 high resolution data bits. Thus, depending on the type of error correction, and the number of bits per character, the high resolution portion of the label can provide between 30 to 150 additional characters of information.

Thus, the label contain 119 bits of low resolution information plus 627 bits of high resolution information for a total of 746 bits. The total number of bits in the label, and the allocated portion of the total bits to high priority data (low resolution) versus low priority data (high resolution) data can be increased or decreased by varying the overall size of the label and/or varying the ratio of the large cell size to the small cell size.

In general, it is desirable to apply error correction to both the low and high resolution encoding and decoding process to insure a very high degree of data integrity upon decoding the message. Conventional error correcting techniques familiar to those skilled in the art may be used in the encoding and decoding processes.

The high resolution decode begins at the center of each large cell and determines the location of the small cells contained within the large cells. Once the locations of the small cells within the large cells are determined, the encoded data can be recovered in a procedure that is the inverse of the encoding procedure.

Figure 14B:
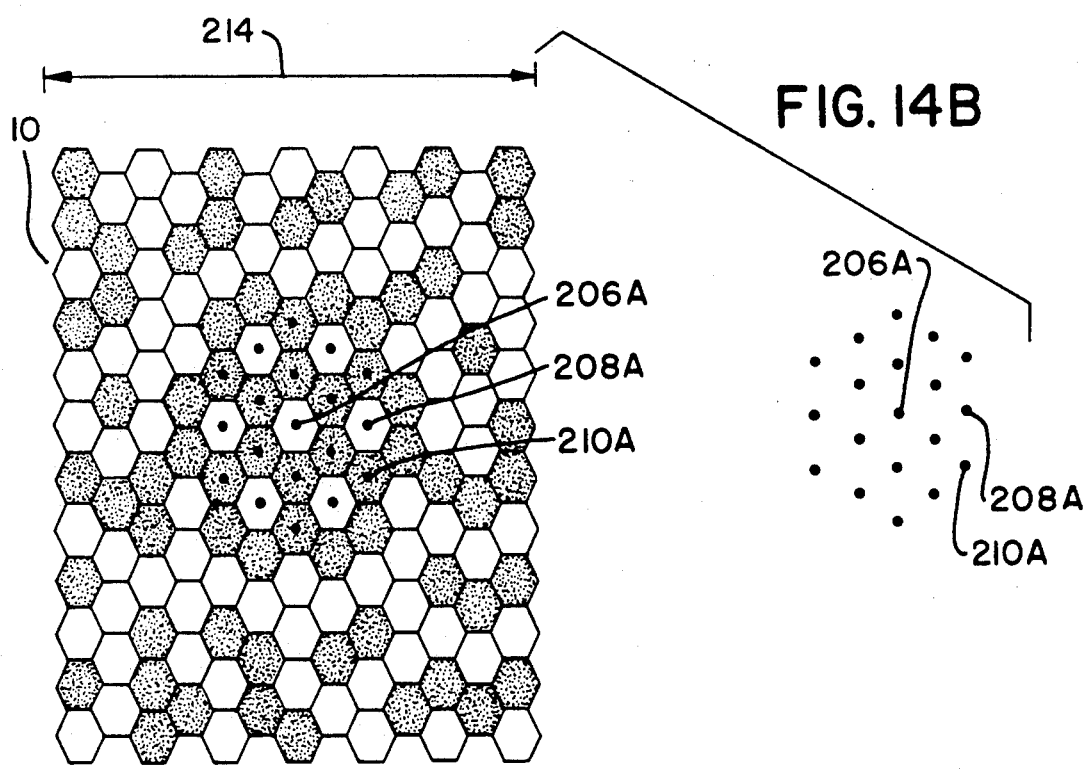

FIG. 14b illustrates the effect of a tilted label and how the present system compensates for the resulting distortion. Since the label in FIG. 14b is tilted, width 214 will be less than the width 212 in FIG. 14a. However, since the geometric arrangement of the finder pattern is analogous to the geometric arrangement of the data array, then the geometric pattern of the 7 cell finder pattern will contain the same distortions along the same axis as the label 10. Consequently in FIG. 14b, distance between cell centers 206a and 208a will be less than the distance between cell centers 206 and 208 in FIG. 14a. However, since the distortion in this example is only along one axis, the distance between cell center 208a and cell center 210a in FIG. 14b will be the same as the distance between cell center 208 and cell center 210 in FIG. 14a.

In general, the detected 7 cell finder pattern will reflect any distortions found in the label. Furthermore, any distortions in the detected 7 cell finder pattern will be incorporated into the constructed 19 point large cell center sampling pattern, including any distortions due to magnification and tilt. Since the 19 point large cell center sampling pattern shown in the right-hand portion of FIG. 14b contains the same distortions as found in label, the locations of the cells in the label will still be accurately found. Finally, averaging the large number of data points collected for each of the large data cell locations using the 19 point large cell center sampling pattern, tends to produce an accurate value of the true center location of each of the large data cells.

Most of the advantages of low resolution encoding and decoding are realized in the image acquisition system. The depth of field increases, permitting the use of fixed focus optics having reduced tolerances, and the required illumination power is reduced. The required size of the image buffer memory is reduced, and the data processing requirements are reduced as a result of having less data at a slower rate to process. For example, low resolution information may be sampled at 32 pixels per inch at 4 bits per pixel. A large cell which has a diameter of 3 pixels results in 2 to 3 samples per cell. The diameter of the high resolution cells is approximately ⅓ the diameter of the low resolution cells. Therefore the optics and imager in a high resolution system must resolve features 3 times smaller than a low resolution system. Therefore it may be necessary to use a lens with variable focus and/or zoom, a distance measuring device to measure the label distance in order to set the focus and/or zoom prior to capturing the image. The imager must be of higher resolution. Finally, the high resolution image buffer must be at least 9 times the size of the low resolution image buffer since the sampling factor is increased by a factor of 3 in both directions.

The label, process and system of the present invention takes advantage of the low resolution large cell features, while encoding high resolution data at a very high density. If only low resolution data is necessary, the overall optical reader system is much less complex than a high and low resolution system. Only when high resolution data is necessary, will the additional complexity of a high resolution optical reader system be required.

What is claimed is:

1. An optically encoded label, including an improved finder pattern, comprising:
    a two dimensional data array of optically encoded data cells arranged in a predetermined geometric data array pattern; and
    a plurality of spots, wherein
    said plurality of spots is arranged in a two dimensional array having a predetermined geometric pattern with a known predetermined relationship to said predetermined geometric data array pattern.

2. In an optically encoded label in accordance with claim 1 further containing a two dimensional array of data cells, an improved finder pattern further comprising:
    wherein each of said plurality of spots occupies an area substantially equal to the area of a data cell of said two dimensional array of data cells.

3. In an optically encoded label in accordance with claim 2, an improved finder pattern further comprising:
    wherein each of said plurality of spots occupies an area substantially equal to the area of a data cell of said two dimensional array of data cells having a first reflectivity; and
    wherein each of said plurality of spots is substantially surrounded by a plurality of areas of a second reflectivity each substantially equal to the area of a data cell of said two dimensional array of data cells data cells.

4. An improved finder pattern for use in an optically encoded label in accordance with claim 1, wherein said plurality of spots are arranged in a symmetrical geometric pattern.

5. An improved finder pattern for use in an optically encoded label in accordance with claim 1, wherein said plurality of spots are arranged in an asymmetrical geometric pattern.

6. An improved finder pattern for use in an optically encoded label in accordance with claim 1, wherein said plurality of spots are arranged in a regular geometric pattern.

7. An improved finder pattern for use in an optically encoded label in accordance with claim 1, wherein said predetermined geometric pattern of said plurality of spots comprises the 6 points at the vertices of a regular hexagon plus the center point.

8. In an optically encoded label containing a two dimensional array of data cells arranged in a predetermined geometric pattern, an improved finder pattern further comprising:
    a plurality of spots, wherein
    said plurality of spots is arranged in a two dimensional array having a predetermined geometric pattern with a known predetermined relationship to said predetermined geometric pattern of said plurality of said data cells.

9. In a system for reading an optically encoded label having a finder pattern comprising a plurality of spots, wherein said plurality of spots is arranged in a two dimensional array having a predetermined geometric pattern, a method for detecting the location of said optically encoded label comprising:
    capturing a two dimensional image for storage in a memory, said stored two dimensional image containing an image of said optically encoded label anywhere within the field of view of said stored two dimensional image;
    examining said stored two dimensional image to detect said plurality of spots; and
    matching said detected plurality of spots to said predetermined geometric pattern.

10. A method in accordance with claim 9, wherein said step of examining said stored two dimensional image to detect said plurality of spots comprises:
    determining the optical values of stored pixels surrounding a given pixel of said stored two dimensional image, said surrounding pixels being approximately a predetermined fixed distance from said given pixel.

11. A method in accordance with claim 10, wherein said predetermined fixed distance from said given pixel to each of said surrounding pixels is substantially equal to the respective diameter of each of said plurality of spots.

12. A method in accordance with claim 11, wherein said step of determining the optical values of said stored pixels surrounding a given pixel of said stored two dimensional image is repeated for each pixel in said stored two dimensional image.

13. A method in accordance with claim 12 further comprising:

identifying the corresponding locations of said given pixels for which a predetermined number of said surrounding pixels said predetermined fixed distance from said given pixel, are of a contrasting reflectivity compared to the reflectivity of each of said respective given pixels.

14. A method in accordance with claim 13, wherein the number of said surrounding pixels is equal to 8, and said predetermined number of said surrounding pixels is equal to 7.

15. A method in accordance with claim 9, wherein said step of matching said detected plurality of spots to said predetermined geometric pattern comprises:
selecting a pair of said plurality of detected spots, wherein the spacing between said selected pair of detected spots approximately corresponds to the spacing between two of said finder spots;
assuming said selected pair of detected spots corresponds to an edge of said predetermined geometric pattern; and
matching the remaining spots of said plurality of detected spots to said predetermined geometric pattern.

16. A method in accordance with claim 9, wherein said step of matching said detected plurality of spots to said predetermined geometric pattern comprises:
selecting a pair of said plurality of detected spots, wherein the spacing between said selected pair of detected spots approximately corresponds to the spacing between two of said finder spots;
assuming said selected pair of detected spots corresponds to an edge of said predetermined geometric pattern; and
matching the remaining spots of said plurality of detected spots to a flipped image of said predetermined geometric pattern.

17. A method in accordance with claim 9, wherein said step of matching said detected plurality of spots to said predetermined geometric pattern comprises:
selecting a pair of said plurality of detected spots, wherein the spacing between said selected pair of detected spots approximately corresponds to the spacing between two of said finder spots;
assuming said selected pair of detected spots corresponds to a radius of said predetermined geometric pattern; and
matching the remaining spots of said plurality of detected spots to said predetermined geometric pattern.

18. A method in accordance with claim 9, wherein said step of matching said detected plurality of spots to said predetermined geometric pattern comprises:
selecting a pair of said plurality of detected spots, wherein the spacing between said selected pair of detected spots approximately corresponds to the spacing between two of said finder spots;
assuming said selected pair of detected spots corresponds to a radius of said predetermined geometric pattern; and
matching the remaining spots of said plurality of detected spots to a flipped image of said predetermined geometric pattern.

19. A method in accordance with claim 9 wherein said step of matching said plurality of spots to said predetermined geometric pattern comprises:
selecting a pair of said plurality of detected spots, wherein the spacing between said selected pair of detected spots approximately corresponds to the spacing between two of said finder spots;
assuming said selected pair of detected spots corresponds to an edge of said predetermined geometric pattern; and
matching the remaining spots of said plurality of detected spots to said predetermined geometric pattern;
matching the remaining spots of said plurality of detected spots to a flipped image of said predetermined geometric pattern;
assuming said selected pair of detected spots corresponds to a radius of said predetermined geometric pattern;
matching the remaining spots of said plurality of detected spots to said predetermined geometric pattern; and
matching the remaining spots of said plurality of detected spots to a flipped image of said predetermined geometric pattern.

20. In a system for reading an optically encoded label containing a two dimensional array of data cells arranged in a predetermined geometric pattern, a method for reading said optically encoded label data comprising:
capturing a two dimensional image for storage in a memory, said stored two dimensional image containing an image of said optically encoded label anywhere within the field of view of said stored two dimensional image;
constructing a cell center sampling pattern having a plurality of points arranged in a geometric pattern with a known predetermined relationship to said predetermined geometric pattern of said two dimensional array of data cells;
positioning said cell center sampling pattern over said two dimensional array of data cells at a first position;
repositioning said cell center sampling pattern over said two dimensional array of data cells at a second position substantially adjacent to said first position;
selecting an optimal position from said first and second positions of said cell center sampling pattern by optimizing a function of image pixels corresponding to said plurality of points, so that said plurality of points of said cell center sampling pattern substantially corresponds to the approximate centers of said data cells, respectively; and
reading out the optical values of said data cells respectively corresponding to said respective plurality of points of said optimal position of said cell center sampling pattern.

21. A method in accordance with claim 20, wherein said step of positioning said cell center sampling pattern comprises:
computing the standard deviation of the optical values of said pixels respectively corresponding to said respective plurality of points of said cell center sampling pattern.

22. A method in accordance with claim 21 further comprising:
moving said cell center sampling pattern to a neighboring point surrounding the approximate centers of said data cells;
recomputing the standard deviation of the optical values of said pixels respectively corresponding to said respective plurality of points of said moved cell center sampling pattern; and selecting the cell center sampling pattern position having the maximum computed standard deviation as the position corresponding to the approximate true centers of said data cells.

23. A method in accordance with claim 20 wherein said step of reading out the optical values of said data cells respectively corresponding to said respective plurality of points of said positioned cell center sampling pattern comprises:

taking a histogram of said optical values substantially corresponding to the approximate centers of said data cells;

establishing a threshold between the maximum and minimum values of said optical values substantially corresponding to the approximate centers of said data cells; and reading out the optical values of said data cells using said established threshold as a reference.

24. A method in accordance with claim 20, wherein said optically encoded label further contains a finder pattern comprising a plurality of spots arranged in a two dimensional array having a predetermined geometric pattern with a known predetermined relationship to said predetermined geometric pattern of said two dimensional array of data cells, wherein said step of constructing a cell center sampling pattern further comprises:

examining said stored two dimensional image to detect said plurality of spots comprising said finder pattern; and constructing said cell center sampling pattern using said detected plurality of finder spots.

25. In a system for reading an optically encoded label containing a two dimensional array of data cells arranged in a predetermined geometric pattern, a method for reading said optically encoded label data comprising:

capturing a two dimensional image for storage in a memory, said stored two dimensional image containing an image of said optically encoded label anywhere within the field of view of said stored two dimensional image;

constructing a cell center sampling pattern having a plurality of points arranged in a geometric pattern with a known predetermined relationship to the predetermined geometric pattern of said two dimensional array of data cells;

positioning said cell center sampling pattern over said two dimensional array of data cells so that said plurality of points of said cell center sampling pattern substantially corresponds to the approximate centers of said data cells;

moving said cell center sampling pattern a distance to an adjacent point, said distance moved substantially corresponding to the width of a data cell of said optically encoded label;

repositioning said moved cell center sampling pattern of said two dimensional array of data cells so that said plurality of points of said moved cell center sampling pattern substantially corresponds to the approximate centers of said data cells, respectively;

averaging the respective coordinates of the points of said positioned and repositioned cell center sampling pattern to provide a plurality of averaged data cell centers; and reading out the optical values of said data cells using said respective averaged coordinates of said data cell centers.

26. A method in accordance with claim 25, wherein said step of positioning said cell center sampling pattern comprises:

computing the standard deviation of the optical values of said pixels respectively corresponding to said respective plurality of points of said cell center sampling pattern.

27. A method in accordance with claim 26 further comprising:

moving said cell center sampling pattern to a neighboring point surrounding the approximate centers of said data cells;

recomputing the standard deviation of the optical values of said pixels respectively corresponding to said respective plurality of points of said moved cell center sampling pattern; and selecting the cell center sampling pattern position having the maximum computed standard deviation as the position corresponding to the approximate true centers of said data cells.

28. A method in accordance with claim 25 wherein said step of reading out the optical values of said data cells respectively corresponding to said respective plurality of points of said positioned cell center sampling pattern comprises:

taking a histogram of said optical values substantially corresponding to the approximate centers of said data cells;

establishing a threshold between the maximum and minimum values of said optical values substantially corresponding to the approximate centers of said data cells; and reading out the optical values of said data cells using said established threshold as a reference.

29. A method in accordance with claim 25, wherein said optically encoded label further contains a finder pattern comprising a plurality of spots arranged in a two dimensional array having a predetermined geometric pattern with a known predetermined relationship to said predetermined geometric pattern of said two dimensional array of data cells, wherein said step of constructing a cell center sampling pattern further comprises:

examining said stored two dimensional image to detect said plurality of spots comprising said finder pattern; and constructing said cell center sampling pattern using said detected plurality of finder spots.

30. In a system for reading an optically encoded label having a finder pattern comprising a plurality of spots, wherein said plurality of spots is arranged in a two dimensional array having a predetermined geometric pattern, an apparatus for detecting the location of said optically encoded label comprising:

means for capturing a two dimensional image for storage in a memory, said stored two dimensional image containing an image of said optically encoded label anywhere within the field of view of said stored two dimensional image;

means for examining said stored two dimensional image to detect said plurality of spots; and means for matching said detected plurality of spots to said predetermined geometric pattern.

31. An apparatus in accordance with claim 30, wherein said means for examining said stored two dimensional image to detect said plurality of spots comprises:

means for determining the optical values of stored pixels surrounding a given pixel of said stored two dimensional image, said surrounding pixels being approximately a predetermined fixed distance from said given pixel.

32. An apparatus in accordance with claim 31, wherein said predetermined fixed distance from said given pixel to each of said surrounding pixels is substantially equal to the respective diameter of each of said plurality of spots.

33. An apparatus in accordance with claim 32, wherein said means for determining the optical values of said stored pixels surrounding a given pixel of said stored two dimensional image includes means for repeating said determination for each pixel in said stored two dimensional image.

34. An apparatus in accordance with claim 33 further comprising:
means for identifying the corresponding locations of said given pixels for which a predetermined number of said surrounding pixels said predetermined fixed distance from said given pixel, are of a contrasting reflectivity compared to the reflectivity of each of said respective given pixels.

35. An apparatus in accordance with claim 34, wherein the number of said surrounding pixels is equal to 8, and said predetermined number of said surrounding pixels is equal to 7.

36. An apparatus in accordance with claim 30, wherein said means for matching said detected plurality of spots to said predetermined geometric pattern comprises:
means for selecting a pair of said plurality of detected spots, wherein the spacing between said selected pair of detected spots approximately corresponds to the spacing between two of said finder spots;
means for assuming said selected pair of detected spots corresponds to an edge of said predetermined geometric pattern; and
means for matching the remaining spots of said plurality of detected spots to said predetermined geometric pattern.

37. An apparatus in accordance with claim 30, wherein said means for matching said detected plurality of spots to said predetermined geometric pattern comprises:
means for selecting a pair of said plurality of detected spots, wherein the spacing between said selected pair of detected spots approximately corresponds to the spacing between two of said finder spots;
means for assuming said selected pair of detected spots corresponds to an edge of said predetermined geometric pattern; and
means for matching the remaining spots of said plurality of detected spots to a flipped image of said predetermined geometric pattern.

38. An apparatus in accordance with claim 30, wherein said means for matching said detected plurality of spots to said predetermined geometric pattern comprises:
means for selecting a pair of said plurality of detected spots, wherein the spacing between said selected pair of detected spots approximately corresponds to the spacing between two of said finder spots;
means for assuming said selected pair of detected spots corresponds to an edge of said predetermined geometric pattern; and
means for matching the remaining spots of said plurality of detected spots to said predetermined geometric pattern.

39. An apparatus in accordance with claim 30, wherein said means for matching said detected plurality of spots to said predetermined geometric pattern comprises:
means for selecting a pair of said plurality of detected spots, wherein the spacing between said selected pair of detected spots approximately corresponds to the spacing between two of said finder spots;
means for assuming said selected pair of detected spots corresponds to an edge of said predetermined geometric pattern; and
means for matching the remaining spots of said plurality of detected spots to a flipped image of said predetermined geometric pattern.

40. An apparatus in accordance with claim 30 wherein said means for matching said plurality of spots to said predetermined geometric pattern comprises:
means for selecting a pair of said plurality of detected spots, wherein the spacing between said selected pair of detected spots approximately corresponds to the spacing between two of said finder spots;
means for assuming said selected pair of detected spots corresponds to an edge of said predetermined geometric pattern;
means for matching the remaining spots of said plurality of detected spots to said predetermined geometric pattern;
means for matching the remaining spots of said plurality of detected spots to a flipped image of said predetermined geometric pattern.
means for assuming said selected pair of detected spots corresponds to a radius of said predetermined geometric pattern;
means for matching the remaining spots of said plurality of detected spots to said predetermined geometric pattern; and
means for matching the remaining spots of said plurality of detected spots to a flipped image of said predetermined geometric pattern.

41. In a system for reading an optically encoded label containing a two dimensional array of data cells arranged in a predetermined geometric pattern, an apparatus for reading said optically encoded label data comprising:
means for capturing a two dimensional image for storage in a memory, said stored two dimensional image containing an image of said optically encoded label anywhere within the field of view of said stored two dimensional image;
means for constructing a cell center sampling pattern having a plurality of points arranged in a geometric pattern with a known predetermined relationship to said predetermined geometric pattern of said two dimensional array of data cells;
means for positioning said cell center sampling pattern over said two dimensional array of data cells at a first position;
repositioning said cell center sampling pattern over said two dimensional array of data cells at a second position substantially adjacent to said first position;
selecting an optimal position from said first and second positions of said cell center sampling pattern by optimizing a function of image pixels corresponding to said plurality of points, so that said plurality of points of said cell center sampling pattern substantially corresponds to the approximate centers of said data cells, respectively; and means for reading out the optical values of said data cells respectively corresponding to said respective plurality of points of said optimal position of said cell center sampling pattern.

42. An apparatus in accordance with claim 41, wherein said means for positioning said cell center sampling pattern comprises:

means for computing the standard deviation of the optical values of said pixels respectively corresponding to said respective plurality of points of said cell center sampling pattern.

43. An apparatus in accordance with claim 42, further comprising:

means for moving said cell enter sampling pattern to a neighboring point surrounding the approximate centers of said data cells;

means for recomputing the standard deviation of the optical values of said pixels respectively corresponding to said respective plurality of points of said moved cell center sampling pattern; and means for selecting the cell center sampling pattern position having the maximum computed standard deviation as the position corresponding to the approximate true centers of said data cells.

44. An apparatus in accordance with claim 41, wherein said means for reading out the optical values of said data cells respectively corresponding to said respective plurality of points of said positioned cell center sampling pattern comprises:

means for taking a histogram of said optical values substantially corresponding to the approximate centers of said data cells;

means for establishing a threshold between the maximum and minimum values of said optical values substantially corresponding to the approximate centers of said data cells; and means for reading out the optical values of said data cells using said established threshold as a reference.

45. A method in accordance with claim 41, wherein said optically encoded label further contains a finder pattern comprising a plurality of spots arranged in a two dimensional array having a predetermined geometric pattern with a known predetermined relationship to said predetermined geometric pattern of said two dimensional array of data cells, wherein said step of constructing a cell center sampling pattern further comprises:

means for examining said stored two dimensional image to detect said plurality of spots comprising said finder pattern; and means for constructing said cell center sampling pattern using said detected plurality of finder spots.

46. In a system for reading an optically encoded label containing a two dimensional array of data cells arranged in a predetermined geometric pattern, an apparatus for reading said optically encoded label data comprising:

means for capturing a two dimensional image for storage in a memory, said stored two dimensional image containing an image of said optically encoded label anywhere within the field of view of said stored two dimensional image;

means for constructing a cell center sampling pattern having a plurality of points arranged in a geometric pattern with a known predetermined relationship to the predetermined geometric pattern of said two dimensional array of data cells;

means for positioning said cell center sampling pattern over said two dimensional array of data cells so that said plurality of points of said cell center sampling pattern substantially corresponds to the approximate centers of said data cells;

means for moving said cell center sampling pattern a distance to an adjacent point, said distance moved substantially corresponding to the width of a data cell of said optically encoded label;

means for repositioning said moved cell center sampling pattern of said two dimensional array of data cells so that said plurality of points of said moved cell center sampling pattern substantially corresponds to the approximate centers of said data cells, respectively;

means for averaging the respective coordinates of the points of said positioned and repositioned cell center sampling pattern to provide a plurality of averaged data cell centers; and means for reading out the optical values of said data cells using said respective averaged coordinates of said data cell centers.

47. An apparatus in accordance with claim 46, wherein said means for positioning said cell center sampling pattern comprises:

means for computing the standard deviation of the optical values of said pixels respectively corresponding to said respective plurality of points of said cell center sampling pattern.

48. An apparatus method in accordance with claim 47, further comprising:

means for moving said cell enter sampling pattern to a neighboring point surrounding the approximate centers of said data cells;

means for recomputing the standard deviation of the optical values of said pixels respectively corresponding to said respective plurality of points of said moved cell center sampling pattern; and means for selecting the cell center sampling pattern position having the maximum computed standard deviation as the position corresponding to the approximate true centers of said data cells.

49. An apparatus in accordance with claim 46, wherein said means for reading out the optical values of said data cells respectively corresponding to said respective plurality of points of said positioned cell center sampling pattern comprises:

means for taking a histogram of said optical values substantially corresponding to the approximate centers of said data cells;

means for establishing a threshold between the maximum and minimum values of said optical values substantially corresponding to the approximate centers of said data cells; and means for reading out the optical values of said data cells using said established threshold as a reference.

50. A method in accordance with claim 46, wherein said optically encoded label further contains a finder pattern comprising a plurality of spots arranged in a two dimensional array having a predetermined geometric pattern with a known predetermined relationship to said predetermined geometric pattern of said two dimensional array of data cells, wherein said step of constructing a cell center sampling pattern further comprises:

means for examining said stored two dimensional image to detect said plurality of spots comprising said finder pattern; and means for constructing said cell center sampling pattern using said detected plurality of finder spots.

51. An apparatus for finding an optically encoded label having a finder pattern comprising a plurality of spots arranged in a two dimensional array having a predetermined geometric pattern, said apparatus comprising:

means for capturing a two dimensional image for storage in a memory, said stored two dimensional image containing an image of an optically encoded label anywhere within the field of view of said stored two dimensional image;

a first data processor for detecting individual ones of said plurality of spots; and a second data processor for matching said detected individual ones of said plurality of spots to said predetermined geometric pattern.

52. An apparatus in accordance with claim 51 wherein said optically encoded label further comprises a two dimensional array of data cells having a predetermined geometric pattern with a know predetermined relationship to said predetermined geometric pattern of said plurality of spots, said apparatus further comprising:

a third data processor coupled to said second data processor for reading out data from said optically encoded label.

* * * * *